(12) United States Patent
Liu et al.

(10) Patent No.: US 11,255,565 B2
(45) Date of Patent: Feb. 22, 2022

(54) AIR QUALITY MANAGEMENT SYSTEM AND AIR QUALITY MANAGEMENT METHOD

(71) Applicant: DAIKIN INDUSTRIES, LTD., Osaka (JP)

(72) Inventors: Chenhao Liu, Osaka (JP); Li Liu, Osaka (JP); Ying Li, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/958,441

(22) PCT Filed: Dec. 26, 2018

(86) PCT No.: PCT/JP2018/047881
§ 371 (c)(1),
(2) Date: Jun. 26, 2020

(87) PCT Pub. No.: WO2019/131775
PCT Pub. Date: Jul. 4, 2019

(65) Prior Publication Data
US 2021/0055015 A1   Feb. 25, 2021

(30) Foreign Application Priority Data
Dec. 29, 2017 (CN) .......................... 201711498239.6

(51) Int. Cl.
*F24F 11/63* (2018.01)
*F24F 11/30* (2018.01)
(Continued)

(52) U.S. Cl.
CPC .............. *F24F 11/63* (2018.01); *F24F 11/30* (2018.01); *F24F 11/88* (2018.01);
(Continued)

(58) Field of Classification Search
CPC .... F24F 11/30; F24F 2120/10; F24F 2110/20; F24F 11/54; F24F 2110/50;
(Continued)

(56) References Cited

U.S. PATENT DOCUMENTS 6,993,644 B2 * 1/2006 Anand .................. G06F 9/5027
709/203
9,835,348 B2 * 12/2017 Storm ..................... G05D 22/02
(Continued)

FOREIGN PATENT DOCUMENTS

CN        101178242 A    5/2008
CN        101231019 A    7/2008
(Continued)

OTHER PUBLICATIONS

International Search Report of corresponding PCT Application No. PCT/JP2018/047881 dated Feb. 12, 2019.
(Continued)

*Primary Examiner* — Darrin D Dunn
(74) *Attorney, Agent, or Firm* — Global IP Counselors, LLP

(57) ABSTRACT

An air quality management system includes a plurality of air treatment apparatuses mutually associated, and a control unit connected the air treatment apparatuses. The control unit makes setting such that one air treatment apparatus has a running priority. The control unit includes an information collection module that collects at least one of a user parameter, an air quality parameter, and a running parameter of the air treatment apparatuses. The control unit processes information collected by the information collection module and acquires a processing result. The control unit sets a running priority of one of the air treatment apparatuses based on the processing result. The air treatment apparatus that is set so as to have the running priority adjusts its operating state
(Continued)

based on the processing result, and simultaneously adjusts an operating state of another of the air treatment apparatuses based on the processing result.

19 Claims, 8 Drawing Sheets

(51) Int. Cl.
| | |
|---|---|
| *F24F 11/88* | (2018.01) |
| *F24F 110/20* | (2018.01) |
| *F24F 110/50* | (2018.01) |
| *F24F 120/12* | (2018.01) |
| *F24F 120/14* | (2018.01) |
| *F24F 110/10* | (2018.01) |

(52) U.S. Cl.
CPC ....... *F24F 2110/10* (2018.01); *F24F 2110/20* (2018.01); *F24F 2110/50* (2018.01); *F24F 2120/12* (2018.01); *F24F 2120/14* (2018.01)

(58) Field of Classification Search
CPC .............. F24F 2120/12; F24F 11/0001; F24F 2110/00; F24F 2110/64; F24F 11/63; F24F 11/88; F24F 2120/14; F24F 2110/10; F24F 7/007; G05B 15/02; G05B 2219/2614; G05B 19/042; G05B 2219/2642; G05B 2219/25011; Y02B 30/70
See application file for complete search history.

(56) References Cited

U.S. PATENT DOCUMENTS

| | | | | |
|---|---|---|---|---|
| 9,944,228 | B2* | 4/2018 | Kirsch | B60Q 1/00 |
| 2008/0110187 | A1* | 5/2008 | Han | F24F 11/30 |
| | | | | 62/159 |
| 2008/0179411 | A1* | 7/2008 | Park | F24F 11/62 |
| | | | | 236/51 |
| 2013/0166074 | A1* | 6/2013 | Hattori | F24F 11/30 |
| | | | | 700/276 |
| 2013/0253709 | A1* | 9/2013 | Renggli | G05D 23/1919 |
| | | | | 700/278 |
| 2013/0289778 | A1* | 10/2013 | Ishizaka | G05D 23/1905 |
| | | | | 700/276 |
| 2015/0075763 | A1* | 3/2015 | Kim | B60H 1/00742 |
| | | | | 165/203 |
| 2016/0209070 | A1* | 7/2016 | Hrejsa | F24F 11/30 |
| 2017/0038787 | A1* | 2/2017 | Baker | H04W 4/33 |
| 2018/0113484 | A1* | 4/2018 | Dyess | G05F 1/66 |
| 2018/0133484 | A1* | 5/2018 | Dinsmoor | A61N 1/36071 |
| 2018/0209676 | A1* | 7/2018 | Mangsuli | F24F 11/62 |
| 2018/0309291 | A1* | 10/2018 | Jun | H02J 13/00001 |
| 2019/0086115 | A1* | 3/2019 | Castillo | G05B 15/02 |
| 2020/0198439 | A1* | 6/2020 | Yu | B60H 1/0073 |
| 2020/0284460 | A1* | 9/2020 | Hur | F24F 11/54 |

FOREIGN PATENT DOCUMENTS

| | | |
|---|---|---|
| EP | 2 623 879 A2 | 1/2013 |
| JP | 10-232040 A | 9/1998 |
| JP | 2002-250555 A | 9/2002 |
| JP | 2005-121316 A | 5/2005 |
| JP | 2008-267795 A | 11/2008 |
| JP | 2010-281549 A | 12/2010 |
| JP | 2013-155969 A | 8/2013 |

OTHER PUBLICATIONS

International Preliminary Report of corresponding PCT Application No. PCT/JP2018/047881 dated Jul. 9, 2020.
European Search Report of corresponding EP Application No. 18 89 6841.6 dated Feb. 1, 2021.

* cited by examiner

AIR QUALITY MANAGEMENT SYSTEM AND AIR QUALITY MANAGEMENT METHOD

CROSS-REFERENCE TO RELATED APPLICATIONS

This U.S. National stage application claims priority under 35 U.S.C. § 119(a) to Chinese Patent Application No. 201711498239.6, filed in China on Dec. 29, 2017, the entire contents of which are hereby incorporated herein by reference.

BACKGROUND

Field of the Invention

The present disclosure relates to air quality management, and relates particularly to an air quality management system and an air quality management method.

Background Information

With the enhancement of our consciousness toward the harmfulness of environmental pollution, how to enhance air quality, particularly indoor air quality, and how to improve our living and working environment have become great issues.

In daily living, it is normal to install an air conditioner in a room so as to adjust the indoor temperature. By virtue of the enhancement of the living level, there is a case where the humidity or cleanness of indoor air is adjusted by using an auxiliary air treatment apparatus such as a humidifier, a dehumidifier, a fresh air system, a ventilation fan, or an air cleaner in accordance with actual environment requirements. For example, see JP 2005-121316 A.

These various air treatment apparatuses usually run in a separate manner, but the problem of mutual interference arises if two or more of them are used simultaneously.

For example, on the occasion of cooling or heating a room with an air conditioner, if a fresh air system introduces fresh air from outside the room, the effect of cooling or heating the room by the air conditioner is reduced, and useless energy consumption is caused. The various air treatment apparatuses described above are hard to compile as one device due to the limitations of use conditions.

In addition, even if the various air treatment apparatuses described above are compiled as one device, it is unlikely that all requirements by people for air quality suitable for different spaces in the living environment can be satisfied.

Further, in the case where there are a plurality of rooms, generally air conditioners are installed individually for the plurality of rooms. How to adjust the running modes of air conditioners and auxiliary air treatment apparatus in different rooms in order to enable energy saving while satisfying the user's comfortableness is also an issue to be solved.

SUMMARY

An issue of the present disclosure is to provide an air quality management system and an air quality management method that can acquire a better management effect by causing the running modes of various air treatment apparatuses to cooperate.

In order to solve the above technical problem, the present disclosure provides an air quality management system including a plurality of air treatment apparatuses mutually associated, and a control means connected to each of the plurality of air treatment apparatuses and configured to make setting such that one air treatment apparatus among the plurality of air treatment apparatuses has a running priority, in which the control means includes an information collection module that collects at least one of a user parameter, an air quality parameter, and a running parameter of the air treatment apparatuses, the control means processes information collected by the information collection module and acquires a processing result, the control means sets a running priority of one of the air treatment apparatuses based on the processing result, and the air treatment apparatus that is set so as to have the running priority adjusts an operating state of itself based on the processing result and simultaneously the air treatment apparatus having the running priority adjusts an operating state of another of the air treatment apparatuses in the system based on the processing result.

Setting the running priority based on air quality in the environment, the user parameter, etc. increases the accuracy of control, and adjusting the operating state of the air treatment apparatus in accordance with the running priority helps to ensure the user's comfort, on the other hand enables energy saving, and raises the degree of intelligence increase.

In the present disclosure, the running priority of the air treatment apparatus is set and the operating state of the air treatment apparatus is adjusted based on the user parameter, the air quality parameter, and the running parameter of the air treatment apparatus; this makes control intelligent, increases adjustment accuracy, and makes it possible to satisfy the requirement of the user's comfort.

According to an embodiment of the present disclosure, the user parameter includes one or more of a user's location region, a user's living body parameter, and a user's activity state.

According to an embodiment of the present disclosure, the air quality parameter includes at least one of an air temperature parameter, an air cleanness parameter, and an air humidity parameter.

According to an embodiment of the present disclosure, the control means includes an information processing module that processes information collected by the information collection module and acquires a processing result.

According to an embodiment of the present disclosure, the plurality of air treatment apparatuses include a first class air treatment apparatus and a second class air treatment apparatus, the first class air treatment apparatus is an air conditioner, the second class air treatment apparatus is one of a fresh air apparatus, an air cleaner, and a ventilation fan, and the air quality parameter includes an air temperature parameter and an air cleanness parameter, the control means processes the air quality parameter, and the first class air treatment apparatus is set so as to have a running priority in a case where the processing result has shown that an indoor air temperature parameter is outside a prescribed range and an indoor air cleanness parameter is within a prescribed range, and the air conditioner adjusts an operating state of one of the fresh air apparatus, the air cleaner, and the ventilation fan based on the processing result. The air treatment apparatus in the present embodiment has various kinds; different kinds of air treatment apparatuses can be selected based on the processing result so that the requirement of the user's comfort can be satisfied. In the present embodiment, setting the running priority of the air treatment apparatus based on the indoor air temperature parameter and the indoor cleanness parameter increases the accuracy of control, enables energy saving, and makes it possible to further satisfy requirements for air temperature and cleanness by the user.

According to an embodiment of the present disclosure, the plurality of air treatment apparatuses include a first class air treatment apparatus and a second class air treatment apparatus, the first class air treatment apparatus is an air conditioner, and the second class air treatment apparatus is one of a fresh air apparatus, an air cleaner, a ventilation fan, and a humidifying and dehumidifying machine, the air quality parameter includes an air temperature parameter, an air cleanness parameter, and an air humidity parameter, the control means processes the air quality parameter, the first class air treatment apparatus is set so as to have a running priority in a case where the processing result has shown that an indoor air temperature parameter is outside a prescribed range, an indoor air cleanness parameter is within a prescribed range, and an indoor air humidity parameter is within a prescribed range, and the first class air treatment apparatus adjusts an operating state of another of the air treatment apparatuses based on the processing result. In the present embodiment, setting the running priority of the air treatment apparatus on the basis of comprehensive consideration on the air temperature parameter, the humidity parameter, and the cleanness parameter increases the accuracy of control and enables energy saving.

According to an embodiment of the present disclosure, the air quality management system includes three or more air treatment apparatuses, and the control means, based on the processing result, makes setting such that one air treatment apparatus among the three or more air treatment apparatuses has a first running priority, the air treatment apparatus having the first running priority adjusts operating states of the three or more air treatment apparatuses based on the processing result and, based on the processing result, makes setting such that another air treatment apparatus among the three or more air treatment apparatuses has a second running priority, and the air treatment apparatus having the second running priority, based on the processing result, adjusts an operating state of another air treatment apparatus other than the air treatment apparatus having the first running priority among the three or more air treatment apparatuses. In the present embodiment, running the priority level for each level for a plurality of air treatment apparatuses makes it possible to perform air treatment according to the actual situation, leads to the satisfaction of requirements for air quality by the user, increases the accuracy of control, and enables energy saving.

According to an embodiment of the present disclosure, the plurality of air treatment apparatuses include at least two air treatment apparatuses that perform air treatment on two regions, respectively, the information collection module collects the user parameter including at least a user's location region, the control means processes the user parameter and, based on the processing result, makes setting such that one air treatment apparatus corresponding to the user's location region among the air treatment apparatuses has a running priority, and the air treatment apparatus having the running priority adjusts operating states of the plurality of air treatment apparatuses based on the processing result. In the present embodiment, setting the running priority of the air treatment apparatus in accordance with the user's location region enables energy saving, and at the same time makes it possible to further satisfy requirements by the user.

According to an embodiment of the present disclosure, in a case where the processing result has shown that one of the air treatment apparatuses that performs air treatment on a region other than the user's location region is an air conditioner, the air treatment apparatus having the running priority makes adjustment so as to turn off the air conditioner. This enables energy saving.

According to an embodiment of the present disclosure, each of the plurality of air treatment apparatuses includes an information transmission and reception module, the information transmission and reception module includes a transmission circuit placed so as to transmit an interlocking signal and a feedback signal, and a reception circuit for receiving an external signal, the reception circuit includes a signal identification circuit for identifying whether the external signal is the feedback signal or not and the interlocking signal transmitted from the air treatment apparatus having the running priority, the transmission circuit in the air treatment apparatus having the running priority transmits the interlocking signal to another of the air treatment apparatuses, and the reception circuit in the air treatment apparatus having the running priority receives the external signal and the signal identification circuit of the reception circuit identifies whether the external signal is the feedback signal sent from another air treatment apparatus or not. This enables detection to a feedback signal by signal identification, and ensures that the air treatment apparatus runs in conformity with a prescribed process.

According to an embodiment of the present disclosure, the signal identification circuit in the air treatment apparatus having the running priority is further connected to the transmission circuit in the air treatment apparatus having the running priority and receives the interlocking signal, and the signal identification circuit compares the external signal and the interlocking signal, and in a case where the external signal matches with the interlocking signal, determines that the external signal is the feedback signal, and in a case where the external signal does not match with the interlocking signal, determines that the external signal is not the feedback signal. This enables detection to a feedback signal by signal identification, and ensures that the air treatment apparatus runs in conformity with a prescribed process.

According to an embodiment of the present disclosure, the signal identification circuit in the air treatment apparatus having the running priority sets a prescribed signal in advance, the signal identification circuit compares the external signal and the prescribed signal, and in a case where the external signal matches with the prescribed signal, determines that the external signal is the feedback signal, and in a case where the external signal does not match with the prescribed signal, determines that the external signal is not the feedback signal.

According to an embodiment of the present disclosure, the signal identification circuit in the air treatment apparatus having the running priority is connected to the control means and outputs an identification result, and the control means, based on the identification result, instructs the transmission circuit in the air treatment apparatus having the running priority whether to re-transmit the interlocking signal or not.

According to an embodiment of the present disclosure, the control means executes a control process and provides the interlocking signal to the information transmission and reception module in the air treatment apparatus having the running priority, and in a case where the external signal is the feedback signal, the control means continuously executes the control process and thus instructs the transmission circuit in the air treatment apparatus having the running priority to transmit another interlocking signal, and in a case where the external signal is not the feedback signal, the control means instructs the transmission circuit to re-transmit the interlocking signal. The signal identification makes it possible to assess whether an interlocking signal has been successfully transmitted or not.

According to an embodiment of the present disclosure, there is a waiting time between adjacent two times of transmission of interlocking signals sent by the transmission circuit in the air treatment apparatus having the running priority. This makes it possible to prevent a collision from occurring between two times of transmission of interlocking signals.

The present disclosure further provides an air quality management method providing a plurality of air treatment apparatuses mutually associated, and a control means connected to each of the plurality of air treatment apparatuses and configured to make setting such that one air treatment apparatus among the plurality of air treatment apparatuses has a running priority, in which the control means includes an information collection module that collects at least one of a user parameter, an air quality parameter, and a running parameter of the air treatment apparatuses, the control means processes information collected by the information collection module and acquires a processing result, the control means sets a running priority of one of the air treatment apparatuses based on the processing result, and the air treatment apparatus that is set so as to have the running priority adjusts an operating state of itself based on the processing result and simultaneously the air treatment apparatus having the running priority adjusts an operating state of another of the air treatment apparatuses in the system based on the processing result. Setting the running priority based on air quality in the environment, the user parameter, etc. increases the accuracy of control, and adjusting the operating state of the air treatment apparatus in accordance with the running priority helps to ensure the user's comfort, on the other hand enables energy saving, and raises the degree of intelligence increase.

According to an embodiment of the present disclosure, the plurality of air treatment apparatuses include a first class air treatment apparatus and a second class air treatment apparatus, and in the method, the control means determines that the first class air treatment apparatus is an air conditioner and assesses that the second class air treatment apparatus is one of a fresh air apparatus, an air cleaner, and a ventilation fan, the information collection module collects an indoor air temperature parameter and an indoor air cleanness parameter, an information processing module processes the air quality parameter, the control means makes setting such that the first class air treatment apparatus has the running priority in a case where the processing result has shown that the indoor air temperature parameter is outside a prescribed range and the indoor air cleanness parameter is within a prescribed range, the first class air treatment apparatus adjusts an operating state of the second class air treatment apparatus based on the processing result, the control means makes setting such that the second class air treatment apparatus has the running priority in a case where the processing result has shown that the indoor air temperature parameter is within a prescribed range and the indoor air cleanness parameter is outside a prescribed range, and the second class air treatment apparatus adjusts an operating state of the first class air treatment apparatus based on the processing result. In the present embodiment, setting the running priorities of the air conditioner, the fresh air apparatus, and the air cleaner based on the indoor air temperature parameter and the indoor cleanness parameter makes it possible to adjust the indoor air temperature and the indoor cleanness in accordance with actual environmental requirements, ensures that requirements for air temperature and cleanness by the user can be satisfied simultaneously, increases the accuracy of control, and enables energy saving.

According to an embodiment of the present disclosure, the plurality of air treatment apparatuses include a first class air treatment apparatus and a second class air treatment apparatus, and in the method, the control means determines that the first class air treatment apparatus is an air conditioner and assesses that the second class air treatment apparatus is one of a fresh air apparatus, an air cleaner, a ventilation fan, and a humidifying and dehumidifying machine, the information collection module collects an air temperature parameter, an air cleanness parameter, and an air humidity parameter, the control means processes the air quality parameter, the control means makes setting such that the first class air treatment apparatus has the miming priority in a case where the processing result has shown that an indoor air temperature parameter is outside a prescribed range, an indoor air cleanness parameter is within a prescribed range, and an indoor air humidity parameter is within a prescribed range, and the first class air treatment apparatus adjusts an operating state of another of the air treatment apparatuses based on the processing result. In the present embodiment, setting the running priority of the air treatment apparatus based on comprehensive consideration on the air temperature parameter, the cleanness parameter, and the humidity parameter ensures that requirements for air temperature, cleanness, and humidity by the user can be satisfied simultaneously, increases the accuracy of control, and enables energy saving.

According to an embodiment of the present disclosure, in the method, three or more air treatment apparatuses are provided, the control means, based on the processing result, makes setting such that one air treatment apparatus among the three or more air treatment apparatuses has a first running priority, the air treatment apparatus having the first running priority adjusts operating states of the three or more air treatment apparatuses based on the processing result and, based on the processing result, makes setting such that another air treatment apparatus among the three or more air treatment apparatuses has a second running priority, and the air treatment apparatus having the second running priority, based on the processing result, adjusts an operating state of another air treatment apparatus other than the air treatment apparatus having the first running priority among the three or more air treatment apparatuses. In the present embodiment, running the priority level for each level for a plurality of air treatment apparatuses makes it possible to perform air treatment according to the actual situation, leads to the satisfaction of requirements for air quality by the user, increases the accuracy of control, and enables energy saving.

According to an embodiment of the present disclosure, in the method, the plurality of air treatment apparatuses include at least two air treatment apparatuses that perform air treatment on two regions, respectively, the information collection module collects a parameter of a user's location region, the control means processes the parameter of the user's location region and, based on the processing result, makes setting such that one air treatment apparatus corresponding to the user's location region among the air treatment apparatuses has a running priority, and the air treatment apparatus having the running priority adjusts operating states of the plurality of air treatment apparatuses based on the processing result. The air treatment apparatus in the user's location region can not only adjust the operating states of a plurality of air treatment apparatuses to allow the air quality of the user's location region to satisfy requirements by the user, but also adjust the air treatment apparatuses in the other regions to allow the effect of energy saving to be achieved.

According to an embodiment of the present disclosure, in the method, in a case where the processing result has shown that one of the air treatment apparatuses that performs air treatment on a region other than the user's location region is an air cleaner, the information collection module collects the air quality parameter of the region, the information processing module processes the air cleanness parameter of the region, the air treatment apparatus having the running priority makes adjustment so as to turn off the air cleaner in a case where the air cleanness parameter for the region other than the user's location region is within a prescribed range, and the air treatment apparatus having the running priority makes adjustment so as to turn on the air cleaner in a case where the air cleanness parameter for the region other than the user's location region is outside a prescribed range.

According to an embodiment of the present disclosure, in the method, the information collection module further collects a user's living body parameter and a user's activity state, the information processing module processes the living body parameter or the user's activity state, and the air treatment apparatus having the running priority adjusts an operating state of itself based on the processing result and simultaneously adjusts an operating state of another of the air treatment apparatuses in the system based on the processing result. In the present embodiment, setting the priority of the air treatment apparatus based on the user's living body parameter or the user's activity state parameter makes it possible to further satisfy requirements by the user for air quality in different living bodies or states, and increases the accuracy of control.

According to an embodiment of the present disclosure, the plurality of air treatment apparatuses include a first class air treatment apparatus and a second class air treatment apparatus, and in the method, further, the control means determines that the first class air treatment apparatus is an air conditioner and assesses that the second class air treatment apparatus is one of a fresh air apparatus and a ventilation fan, the information collection module collects an indoor air quality parameter and an outdoor air quality parameter, and each of the indoor air quality parameter and the outdoor air quality parameter includes an air temperature and an air cleanness, the control means processes the indoor air quality parameter and the outdoor air quality parameter, the air conditioner is set so as to have a running priority in a case where the processing result has shown that a difference between an indoor temperature and an outdoor temperature is larger than a prescribed threshold, one of the fresh air apparatus and the ventilation fan is set so as to have a running priority in a case where the processing result has shown that an indoor air cleanness is outside a prescribed range and the difference between the indoor temperature and the outdoor temperature is smaller than a prescribed threshold, and the air conditioner is set so as to have a running priority in a case where the processing result has shown that the difference between the indoor temperature and the outdoor temperature is larger than a prescribed threshold and the indoor air cleanness is outside a range of a prescribed threshold. The assessment conditions in the present embodiment further increase the accuracy of control, and make it possible to achieve further energy saving.

According to an embodiment of the present disclosure, each of the plurality of air treatment apparatuses includes an information transmission and reception module, the information transmission and reception module includes a transmission circuit placed so as to transmit an interlocking signal and a feedback signal, and a reception circuit for receiving an external signal, the reception circuit includes a signal identification circuit for identifying whether the external signal is the feedback signal or not and the interlocking signal transmitted from the air treatment apparatus having the miming priority, and in the method, further, the transmission circuit in the air treatment apparatus having the running priority transmits the interlocking signal to another of the air treatment apparatuses, and the reception circuit in the air treatment apparatus having the running priority receives the external signal and the signal identification circuit of the reception circuit identifies whether the external signal is the feedback signal sent from another air treatment apparatus or not. Detection to a feedback signal by signal identification can be realized, and the air treatment apparatus is ensured to run in conformity with a prescribed process.

According to an embodiment of the present disclosure, in the method, further, the signal identification circuit in the air treatment apparatus having the running priority receives the interlocking signal, and the signal identification circuit compares the external signal and the interlocking signal, and in a case where the external signal matches with the interlocking signal, determines that the external signal is the feedback signal, and in a case where the external signal does not match with the interlocking signal, determines that the external signal is not the feedback signal.

According to an embodiment of the present disclosure, in the method, further, the signal identification circuit in the air treatment apparatus having the running priority receives the interlocking signal, and the signal identification circuit compares the external signal and a prescribed signal, and in a case where the external signal matches with the prescribed signal, determines that the external signal is the feedback signal, and in a case where the external signal does not match with the prescribed signal, determines that the external signal is not the feedback signal.

According to an embodiment of the present disclosure, in the method, further, the signal identification circuit in the air treatment apparatus having the running priority outputs an identification result to the control means, and the control means, based on the identification result, instructs the transmission circuit in the air treatment apparatus having the running priority whether to re-transmit the interlocking signal or not.

According to an embodiment of the present disclosure, in the method, further, the control means provides the interlocking signal to the air treatment apparatus having the running priority, and in a case where the external signal is the feedback signal, the control means continuously executes the control process and thus instructs the transmission circuit in the air treatment apparatus having the running priority to transmit another interlocking signal, and in a case where the external signal is not the feedback signal, the control means instructs the transmission circuit to re-transmit the interlocking signal.

According to an embodiment of the present disclosure, in the method, further, the information collection module collects at least one of the user parameter, the air quality parameter, and the running parameters of the plurality of air treatment apparatuses at prescribed time intervals, and the control means processes information collected by the information collection module and acquires the processing result, and the control means, based on the processing result, selects whether to switch the air treatment apparatus having the running priority or not.

As compared to conventional technology, in the air quality management system and the air quality management method in the present disclosure, an air treatment apparatus that is set so as to have a running priority can adjust the operating state of itself and the operating states of another treatment apparatuses based on a result of information processing, and thus enables energy saving while ensuring the user's comfort, on the other hand helps to prolong the working lives of the air treatment apparatuses and their components, is advantageous in increasing the accuracy of control, and raises the degree of intelligence increase.

DETAILED DESCRIPTION OF EMBODIMENT(S)

For easier understanding of the object, features, and advantages mentioned above of the present disclosure, specific embodiments of the present disclosure will now be described in detail, with the appended drawings tied.

The following description shows a plurality of specific details in order for the present disclosure to be understood sufficiently; however, the present disclosure may be implemented by other systems than those of the following description; thus, the present disclosure is not limited by the specific embodiments of the following disclosure.

As shown in the present application and the scope of claims, in the foregoing and following contexts, words such as "one", "one kind", and/or "the" do not necessarily show the singular but may show the plural, except that exceptional cases are presented clearly. In general, "include" and "contain", which are terms, show only that a step and an element already labeled clearly are included; the step and the element do not constitute one exclusive arrangement, and the method or the equipment may include other steps or elements.

The indoor air quality management system and the indoor air quality management method described in an embodiment of the present disclosure can adjust the running modes of a plurality of kinds of air treatment apparatuses, and thus make it possible to satisfy requirements by the user for air quality for different spaces, and enable energy saving.

Figure 1:
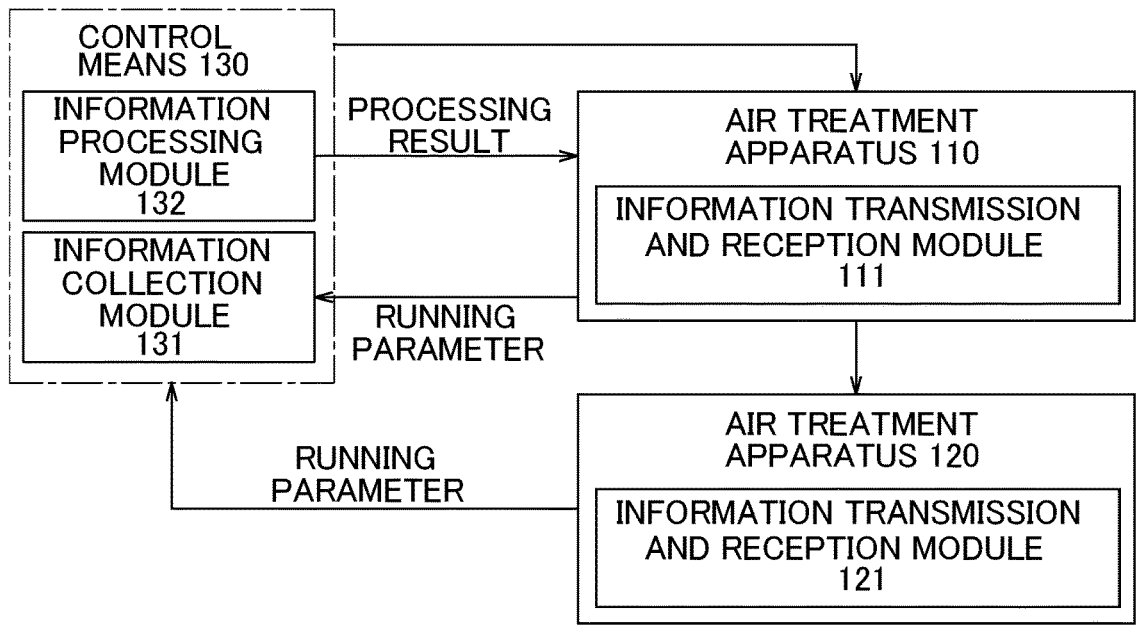
FIG. 1 is a configurational block diagram of an air quality management system according to a first embodiment of the present disclosure.

FIG. 1 is a configurational block diagram of an air quality management system according to a first embodiment of the present disclosure. As shown in FIG. 1, an air quality management system 100 in the present embodiment may include an air treatment apparatus 110, an air treatment apparatus 120, and a control unit or control means 130. The air treatment apparatus 110 and the air treatment apparatus 120 may be a plurality of kinds of apparatuses each capable of adjusting the temperature, humidity, cleanness, or circulation of air, and may include an air conditioner, a fresh air apparatus, an air cleaner, a range hood, a ventilation fan, a humidifying and dehumidifying machine, etc., but are not limited to these. FIG. 1 shows two air treatment apparatuses as an example, but it will also be understood that the number of air treatment apparatuses may be a larger number. The air treatment apparatus 110 and the air treatment apparatus 120 are mutually tied. In at least one mode, the air treatment apparatus 110 and the air treatment apparatus 120 work in mutual cooperation. It will be understood that the air quality management system 100 may have another mode in which the air treatment apparatus 110 and the air treatment apparatus 120 work mutually separately. The air treatment apparatus 110 and the air treatment apparatus 120 may be the same kind of air treatment apparatus, or may be different kinds of air treatment apparatuses. Further, the air treatment apparatus 110 and the air treatment apparatus 120 may be provided in the same region in a space to be adjusted, or may be provided in different regions in a space to be adjusted.

In terms of the foregoing and following contexts of the present disclosure, the space to be adjusted may be an indoor region, or may be a half-opened region or an outdoor region.

The control means 130 may be provided in the air treatment apparatus 110, may be provided in the air treatment apparatus 120, or may be provided separately. In the case where the control means 130 is provided separately, the control means 130 may be located in an arbitrary position in the space to be adjusted. Instead, each air treatment apparatus may include a distributed control means. These distributed control means are interactive, and constitute the control means 130 in the present embodiment.

The control means 130 is connected to each of the air treatment apparatus 110 and the air treatment apparatus 120. The connection system between the control means 130 and each of the air treatment apparatus 110 and the air treatment apparatus 120 may be a wired system or a wireless system. The wired system includes the use of a metal cable, an optical fiber cable, a hybrid cable, an interface, etc., or may include an arbitrary combination of the use of them. The wireless system includes the use of a local area network (LAN), a wide area network (WAN), Bluetooth, ZigBee, etc., or may include an arbitrary combination of the use of them. Examples of the control means 130 include a remote control, a wired remote control, an intelligent terminal, and the like.

The air treatment apparatus 110 may include an information transmission and reception module 111 for transmitting and receiving information. The air treatment apparatus 120 may include an information transmission and reception module 121 for transmitting and receiving information.

In terms of the foregoing and following contexts of the present disclosure, the control means may make setting such that one of the air treatment apparatuses 110 and 120 has a running priority. Then, the air treatment apparatus that is set so as to have a running priority is controlled by the user; on the other hand, other air treatment apparatuses not having a running priority must receive a command sent from the air treatment apparatus having a running priority.

In terms of the foregoing and following contexts of the present disclosure, the running priority may be divided into a plurality of levels. Each of the air treatment apparatuses 110 and 120 may have different levels of running priority in terms of working. In a situation after the levels of running priority of the air treatment apparatus 110 and the air treatment apparatus 120 are set by the control means, as the level of running priority becomes higher, the independence concerning the working of the air treatment apparatus becomes higher; on the other hand, as the level of running priority becomes lower, the independence concerning the working of the air treatment apparatus becomes lower, and the air treatment apparatus becomes more obliged to collaborate with the working of other air treatment apparatuses. For example, it is assumed that a first running priority is higher than a second running priority. The first running priority can be controlled only by the user and is not controlled by the second running priority; on the other hand, the working of the second running priority is controlled by both the user and the first running priority. The following uses analogies based on this.

In an embodiment, manual setting by the user to a running priority or a level of running priority of the air treatment apparatus may be allowed.

The control means 130 may be used in order to make setting such that one of the air treatment apparatus 110 and the air treatment apparatus 120 has a running priority. More specifically, the control means 130 may include an information collection module 131 and an information processing module 132. The information collection module 131 may collect at least one of a user parameter, an air quality parameter, a running parameter of the air treatment apparatus 110, and a running parameter of the air treatment apparatus 120.

The information processing module 132 processes collected parameters and acquires a processing result, and sets the running priority of one of the air treatment apparatuses 110 and 120 based on the processing result. The internal structure of the control means 130 is only an example, and it will be understood that any control means 130 capable of achieving the functions of information collection and information processing falls within the implementation scope of the present disclosure.

An air treatment apparatus that is set so as to have a running priority adjusts the operating state of itself based on the processing result mentioned above, and simultaneously the air treatment apparatus having a running priority adjusts the operating states of another air treatment apparatuses in the system 100 based on the processing result mentioned above. In the following, the air treatment apparatus having a running priority is referred to as a main treatment apparatus, and other air treatment apparatuses are as auxiliary treatment apparatuses.

In the present embodiment, a main treatment apparatus that is set so as to have a running priority can adjust the operating state of itself and the operating states of auxiliary treatment apparatuses based on a result of information processing, and thus enables energy saving while ensuring the user's comfort, and on the other hand helps to prolong the working lives of the air treatment apparatuses and their components.

Figure 4:
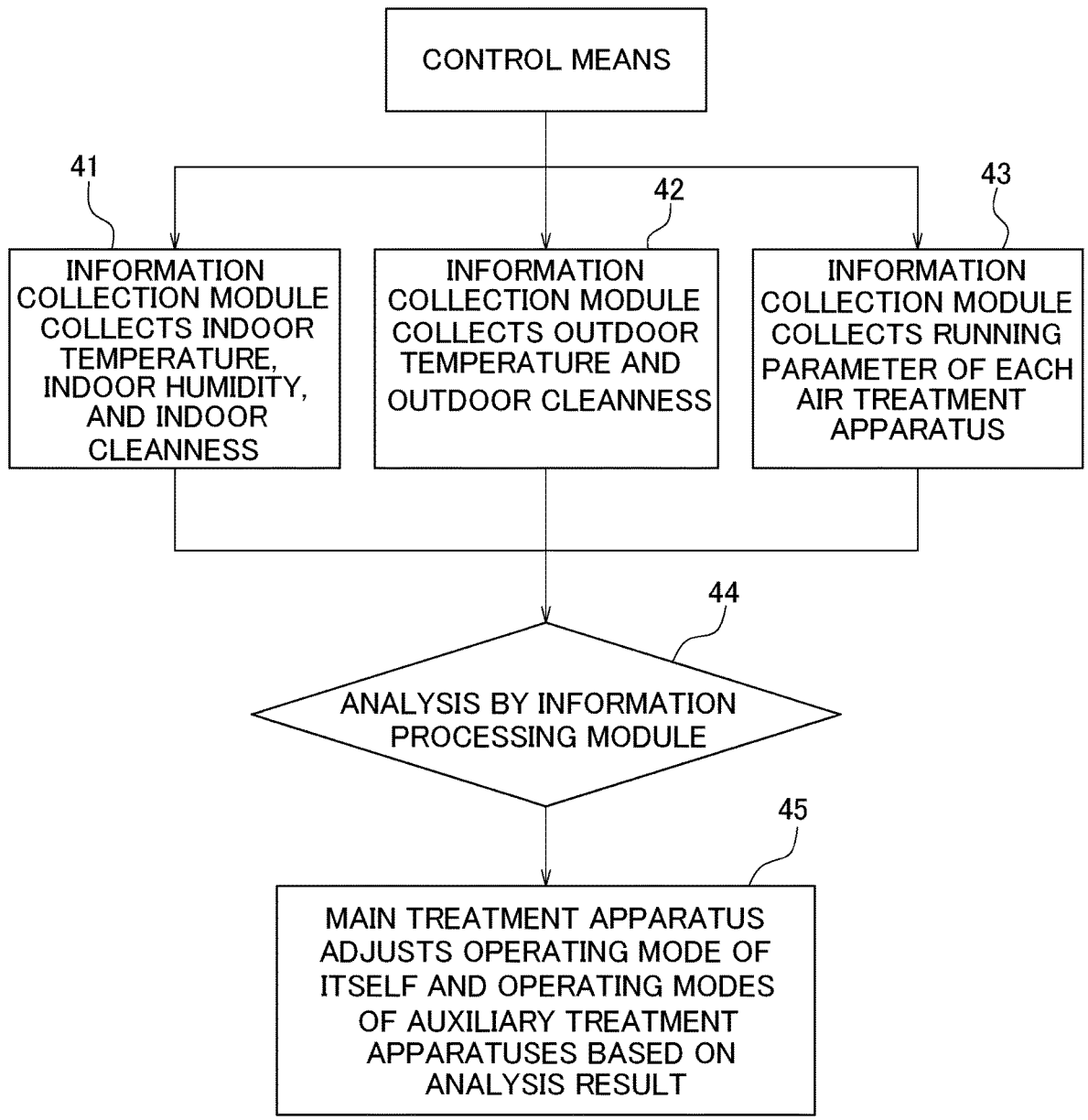
FIG. 4 is a flow chart of an air quality management method according to the first embodiment of the present disclosure.

FIG. 4 is a flow chart of an air quality management method according to the first embodiment of the present disclosure. As shown in FIG. 1 and FIG. 4, the information collection module 131 may execute at least one of manipulations 41 to 43 to collect at least one of the indoor temperature, the indoor humidity, and the indoor cleanness, the outdoor temperature and the outdoor cleanness, and the running parameter of each treatment apparatus. The information processing module 132 may, in manipulation 44, analyze whether the indoor temperature, the indoor humidity, and the indoor cleanness are within ranges of temperature, humidity, and cleanness comfortable to the human body or not, and calculate the difference between the indoor temperature and the outdoor temperature and the difference between the outdoor cleanness and a prescribed cleanness. The information processing module 132 may provide the processing result to the main treatment apparatus. In manipulation 45, the main treatment apparatus may, based on the analysis result, adjust the operating mode of itself and the operating modes of the auxiliary treatment apparatuses. Thus, in the present embodiment, the main treatment apparatus, which is an air treatment apparatus having a running priority, is set by comprehensively analyzing the indoor temperature, the indoor humidity, and the indoor cleanness, the outdoor temperature and the outdoor cleanness, and the running parameter of each treatment apparatus, and the operating mode of each air treatment apparatus is adjusted by the main treatment apparatus. Thereby, the air temperature, the humidity, and the cleanness in the space to be adjusted can be adjusted comprehensively, and energy saving is enabled while the user's comfort is ensured. In addition, the main treatment apparatus can, based on the analysis result, adjust the operating mode of itself and the operating modes of the auxiliary treatment apparatuses, and there is no need for the user to set the operating state or the running parameter of each air treatment apparatus by the user's self; thus, it is helped to improve the convenience of manipulation by the user, and the degree of intelligence increase is raised.

In terms of the foregoing and following contexts of the present disclosure, the user parameter may include one or more of the user's location region, the user's living body parameter, and the user's activity state. From the angle of the region, the air quality parameter may include at least one of an indoor air quality parameter and an outdoor air quality parameter. From the angle of the kind, the air quality parameter may include an air cleanness parameter, and the air cleanness parameter may include at least one of the CO2 concentration, the PM 2.5 concentration, the formaldehyde concentration, smoke, and an offensive smell. The running parameter of the air treatment apparatus may include at least one of the running mode, the compressor frequency, the air sending temperature, the airflow rate, and the number of fan revolutions.

An example of the information collection module 131 may be a combination of various sensors and a communication means. The sensors may include, for example, a temperature sensor, a humidity sensor, a PM 2.5 sensor, a CO2 sensor, a formaldehyde sensor, a SOX sensor, and the like. The communication means may include, for example, a Bluetooth communication means, a WIFI communication means, and the like.

Some application examples of the present embodiment will now be shown.

The air treatment apparatus may include a first class air treatment apparatus and a second class air treatment apparatus.

In an embodiment, the first class air treatment apparatus (for example, the air treatment apparatus 110) is an air conditioner, and is used in order to adjust the temperature of the space to be adjusted. The second class air treatment apparatus (for example, the air treatment apparatus 120) is an apparatus that introduces outdoor fresh air, generates fresh air, or discharges indoor dirty air, and is, for example, a fresh air apparatus, an air cleaner, a ventilation fan, or the like.

The air quality parameter collected by the information collection module 131 of the control means 130 may include an indoor air quality parameter and an outdoor air quality parameter, and each of the indoor air quality parameter and the outdoor air quality parameter may include an air temperature parameter and an air cleanness parameter. The air quality parameter is provided to the information processing module 132, for processing. In the case where the processing result has shown that the indoor air temperature parameter is outside a prescribed range and the indoor air cleanness parameter is within a prescribed range, the air conditioner is set so as to have a first running priority; in the case where the processing result has shown that the outdoor air cleanness is outside the range of a prescribed threshold, the fresh air apparatus, the air cleaner, or the ventilation fan is set so as to have a running priority. Here, the air treatment apparatus having a running priority is referred to as a main treatment apparatus, and the air treatment apparatus not having a running priority or having a lower level of running priority (for example, a second running priority, a third running priority, or the like) is as an auxiliary treatment apparatus. The main treatment apparatus may be controlled by the user; on the other hand, the auxiliary treatment apparatus is controlled by the user and furthermore receives adjustment by the main treatment apparatus. Conversely, the main treatment apparatus does not receive adjustment by the auxiliary treatment apparatus.

For example, when an air conditioner is set as a main treatment apparatus and an air cleaner is as an auxiliary treatment apparatus, a usual purification mode is employed in the air cleaner in order to satisfy the requirement of energy saving.

In the case where the control means 130 has detected that the concentration of pollutants caused by tobacco, etc. in the room has reached a limit value, the air cleaner is switched as a main treatment apparatus, and the operating mode of the air cleaner is switched to a strong purification mode. By switching the main treatment apparatus in accordance with the situation of air quality change in the space to be adjusted, not only can the air quality in the space to be adjusted be improved efficiently, but also energy saving can be achieved.

Figure 5:
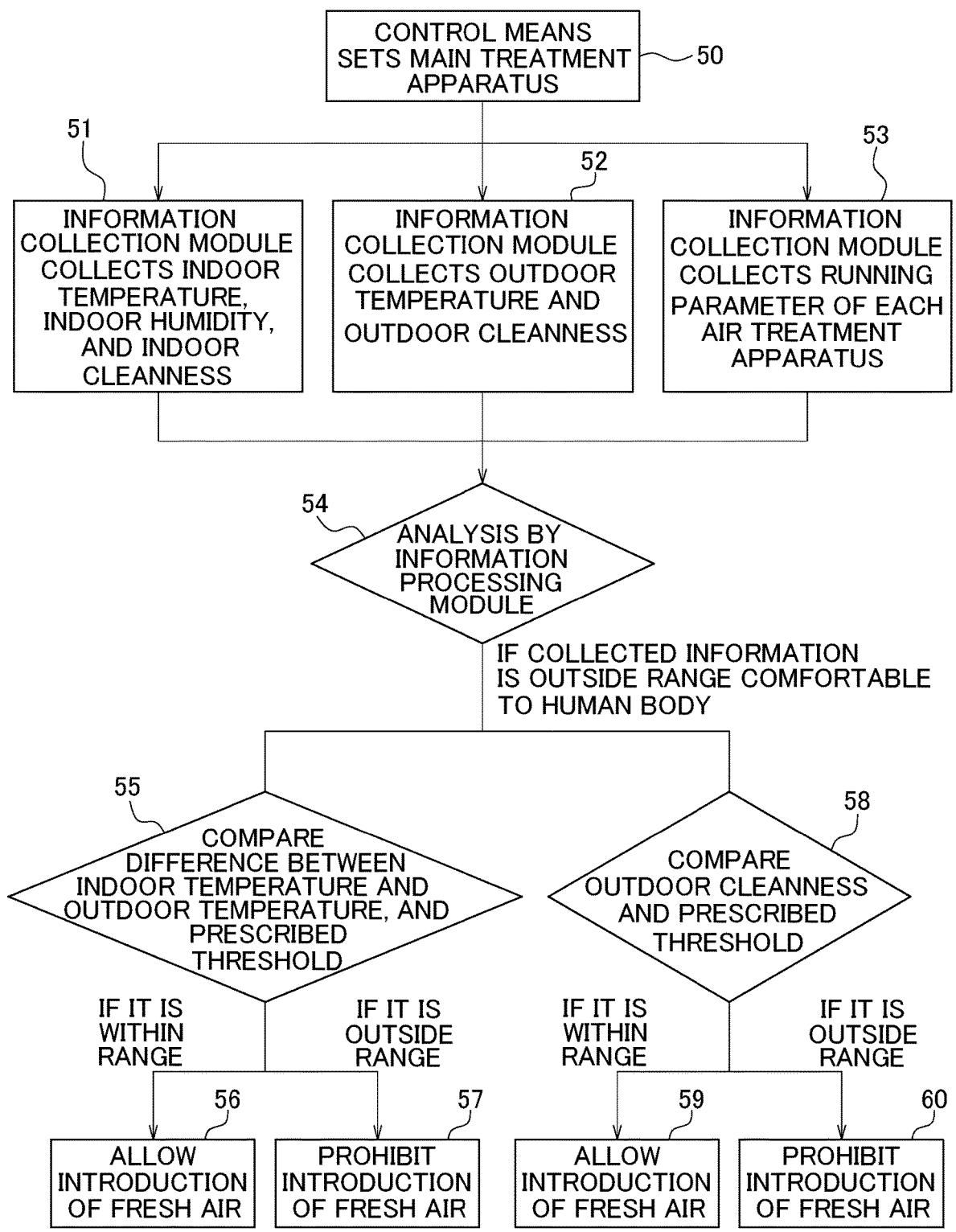
FIG. 5 shows an example of the air quality management method according to the present disclosure.

Further, for example as shown in an example of the air quality management method according to the present disclosure shown in FIG. 5, an air conditioner is set as a main treatment apparatus and a fresh air apparatus is set as an auxiliary treatment apparatus in manipulation 50. The information collection module 131 may execute at least one of manipulations 51 to 53 to collect at least one of the indoor temperature, the indoor humidity, and the indoor cleanness, the outdoor temperature and the outdoor cleanness, and the running parameter of each air treatment apparatus. The information processing module 132 may, in manipulation 54, analyze whether the indoor temperature, the indoor humidity, and the indoor cleanness are within ranges of temperature, humidity, and cleanness comfortable to the human body or not, and calculate the difference between the indoor temperature and the outdoor temperature and the difference between the outdoor cleanness and a prescribed cleanness. The information processing module 132 may provide the processing result to the main treatment apparatus. If the $CO_2$ concentration in the space to be adjusted is outside a concentration range comfortable to the human body, it is necessary to discharge dirty air in the room and introduce fresh air from outside the room.

At this time, in manipulation 55 to 60, the air conditioner adjusts the operating state of the fresh air apparatus in accordance with the operation of the air conditioner itself. In the case where it is assessed in manipulation 55 that the difference between the indoor temperature and the outdoor temperature is within the range of a prescribed threshold, the air conditioner allows the introduction of fresh air from the fresh air apparatus into the room in manipulation 56, and can, in accordance with the actual situation, adjust the airflow rate at which fresh air is introduced. In the case where it is assessed in manipulation 55 that the difference between the indoor temperature and the outdoor temperature is outside the range of a prescribed threshold, the air conditioner prohibits the introduction of fresh air from the fresh air apparatus in manipulation 57, and prevents reduction in comfort due to the indoor temperature. However, at this time, the fresh air apparatus can use an internal circuiting mode to purify the indoor air to adjust the air cleanness. Thereby, both the requirement of temperature and the requirement of cleanness can be satisfied, and energy saving is enabled. Alternatively, in the case where it is assessed in manipulation 58 that the outdoor air cleanness (for example, the PM 2.5 concentration value) is within the range of a prescribed threshold, the air conditioner allows the introduction of fresh air from the fresh air apparatus into the room in manipulation 59; on the other hand, in the case where it is assessed that the outdoor air cleanness (for example, the PM 2.5 concentration value) is outside the range of a prescribed threshold, the air conditioner prohibits the introduction of fresh air from the fresh air apparatus in manipulation 60, but at this time the fresh air apparatus can use an internal circuiting mode to purify the indoor air to adjust the air cleanness. Whether it is necessary to introduce fresh air or not is assessed based on the difference between the indoor temperature and the outdoor temperature, or the outdoor air cleanness parameter, and it is possible to, while satisfying the requirements of air temperature and cleanness, prevent trouble resulting from the introduction of fresh air from the fresh air apparatus in the case where the difference between the indoor temperature and the outdoor temperature is too large or reduction in the life of the fresh air apparatus resulting from the introduction of fresh air in the case where the outdoor air cleanness is not good.

Similarly, in the case where the control means 130 has detected that the concentration of indoor pollutants has reached a limit value, the control means 130 switches the fresh air apparatus to a main treatment apparatus and the air conditioner to an auxiliary treatment apparatus, and switches the operating mode of the fresh air apparatus to an air emission mode or a ventilation mode. In the case where the operating mode of the fresh air apparatus is the ventilation mode, the air conditioner can adjust the amount of temperature adjustment based on the airflow rate of fresh air introduced.

After the air conditioner is set as a main treatment apparatus, a priority is assigned to the operating mode of the air conditioner, and the running parameter of the auxiliary treatment apparatus is adjusted based on the running parameter of the air conditioner. The air conditioner may transmit an interlocking signal for adjusting the running parameter of the auxiliary treatment apparatus to the auxiliary treatment apparatus by communicating with the information transmission and reception module of the auxiliary treatment apparatus via the information transmission and reception module of the air conditioner itself.

In the case where the control means 130 is composed of distributed treatment means in a plurality of air treatment apparatuses installed, the distributed control means in a main treatment apparatus is a practical control means, and the distributed control means in an auxiliary treatment apparatus does not act.

In the case where the air treatment apparatus 110 is an air conditioner and the air treatment apparatus 120 is a fresh air apparatus, an air cleaner, or a ventilation fan, a main treatment apparatus may be provided in accordance with the season. For example, when winter or summer comes, the air conditioner is set as a main treatment apparatus; when spring or fall comes, the air cleaner is set as a main treatment apparatus. The operating state of the air conditioner may include the compressor frequency, the air sending temperature, the airflow rate, the number of fan revolutions, etc. The operating state of the air cleaner may include the switching of the mode (for example, a fresh air mode, an internal circuiting mode, an air emission mode, etc.), the amount of fresh air introduced, the amount of emitted air, the number of fan revolutions, the valve opening degree, etc. Thus, the setting of the main treatment apparatus according to the season helps to achieve energy saving, and also helps to prolong the working life of the air treatment apparatus.

In another example, the first class air treatment apparatus is an air conditioner, and the second class air treatment apparatus is one of a fresh air apparatus, an air cleaner, a ventilation fan, and a humidifying and dehumidifying machine. The air quality parameter includes an air temperature parameter and an air humidity parameter accordingly. The control means 130 processes the air quality parameter; in the case where the processing result has shown that the indoor air temperature parameter is outside a prescribed range, the indoor air cleanness parameter is within a prescribed range, and the indoor air humidity parameter is within a prescribed range, the air conditioner is set so as to have a running priority. That is, at this time, the air conditioner is a main treatment apparatus, and the fresh air apparatus, the air cleaner, the ventilation fan, or the humidifying and dehumidifying machine is an auxiliary treatment apparatus. A person skilled in the art may decide on the setting of the level of running priority in other cases in accordance with practical necessity. Herein, a description is omitted.

Further, according to another embodiment, the first class air treatment apparatus is an air conditioner and the second class air treatment apparatus is one of a fresh air apparatus and a ventilation fan. The control means 130 processes the indoor air quality parameter and the outdoor air quality parameter, the air conditioner is set so as to have a running priority in a case where the processing result has shown that a difference between an indoor temperature and an outdoor temperature is larger than a prescribed threshold, one of the fresh air apparatus and the ventilation fan is set so as to have a running priority in a case where the processing result has shown that an indoor air cleanness is outside a prescribed range and the difference between the indoor temperature and the outdoor temperature is smaller than a prescribed threshold, and the air conditioner is set so as to have a running priority in a case where the processing result has shown that the difference between the indoor temperature and the outdoor temperature is larger than a prescribed threshold and the indoor air cleanness is outside a range of a prescribed threshold.

In still another example, the air treatment apparatus 110 is installed in a first region, and the air treatment apparatus 120 is installed in a second region. The information collection module 131 of the control means 130 may collect a user parameter including at least the user's location region. The user parameter is provided to the information processing module 132, for processing. In the case where the processing result has shown that the user is in the first region, the air treatment apparatus 110 corresponding to the first region is set so as to have a running priority; in the case where the processing result has shown that the user is in the second region, the air treatment apparatus 120 corresponding to the second region is set so as to have a running priority. In the case where the processing result has shown that the air treatment apparatus that performs air treatment on a region other than the user's location region is an air conditioner, the air treatment apparatus having a running priority makes adjustment so as to turn off the air conditioner. For example, in the case where it is detected that the user has moved from room A to room B, the main treatment apparatus is switched from the air treatment apparatus 110 of room A to the air treatment apparatus 120 of room B. In this example, the information collection module 131 may be a human body sensing sensor, a wearable apparatus, or the like.

In the present embodiment, the first region and the second region may be relatively independent different rooms in the space to be adjusted, or may be communicating different regions in the space to be adjusted. The main treatment apparatus, which is an air treatment apparatus having a running priority, is set in accordance with the user's location region, and the running state of each air treatment apparatus is adjusted by the main treatment apparatus. Thus, not only can the air quality of the user's location region be adjusted so that requirements for comfort by the user can be satisfied, but also an air treatment apparatus in an empty region other than the user's location region can be adjusted. As described above, in the case where the user has moved from room A to room B, the main treatment apparatus is switched from the air treatment apparatus 110 of room A to the air treatment apparatus 120 of room B, and the air treatment apparatus 120 becomes able to adjust the operating state of the air treatment apparatus 110. In the case where the air treatment apparatus 110 is an air conditioner, the air treatment apparatus 120 can make adjustment so as to turn off the air treatment apparatus 110. In the case where the air treatment apparatus 110 is an air cleaner and there are requirements for the air cleanness of room A even though the user is not in room A, the air treatment apparatus 120 adjusts the operating mode of the air cleaner based on the air cleanness parameter of room A, and thereby can satisfy requirements for the air cleanness of room A by the user and further can satisfy requirements by the user for the air quality of the entire space to be adjusted.

In addition, the user region may include a third region or still more regions. Adjustments on the operating states of air treatment apparatuses in the user's location region and other regions make it possible to satisfy requirements for the air quality of the user's location region and to improve the air quality of the entire space to be adjusted.

In still another example, the information collection module 131 may further collect the user's living body parameter or the user's activity state, the information processing module 132 may process the living body parameter or the user's activity state, and the air treatment apparatus having a running priority may adjust the operating state of itself based on the processing result and simultaneously adjust the operating states of another air treatment apparatuses in the system based on the processing result. For example, in the case where an air conditioner is a main treatment apparatus having a running priority and a fresh air apparatus is an auxiliary treatment apparatus, if the information collection module 131 has detected that the user's body temperature is lower than a normal value, the air conditioner can raise the temperature of emitted air, and can also adjust the fresh air apparatus to reduce the amount of fresh air introduced. Alternatively, in the case where the information collection module 131 has detected that the user's body temperature is higher than a normal value, the air conditioner can lower the temperature of emitted air, and can also adjust the fresh air apparatus to increase the amount of fresh air introduced. In the case where the information collection module 131 has detected that the user is in motion (for example, is running), the air conditioner can lower the temperature of emitted air, and can also adjust the fresh air apparatus to increase the amount of fresh air introduced. Thus, requirements for air quality by the user in specific states can be satisfied.

Figure 2:
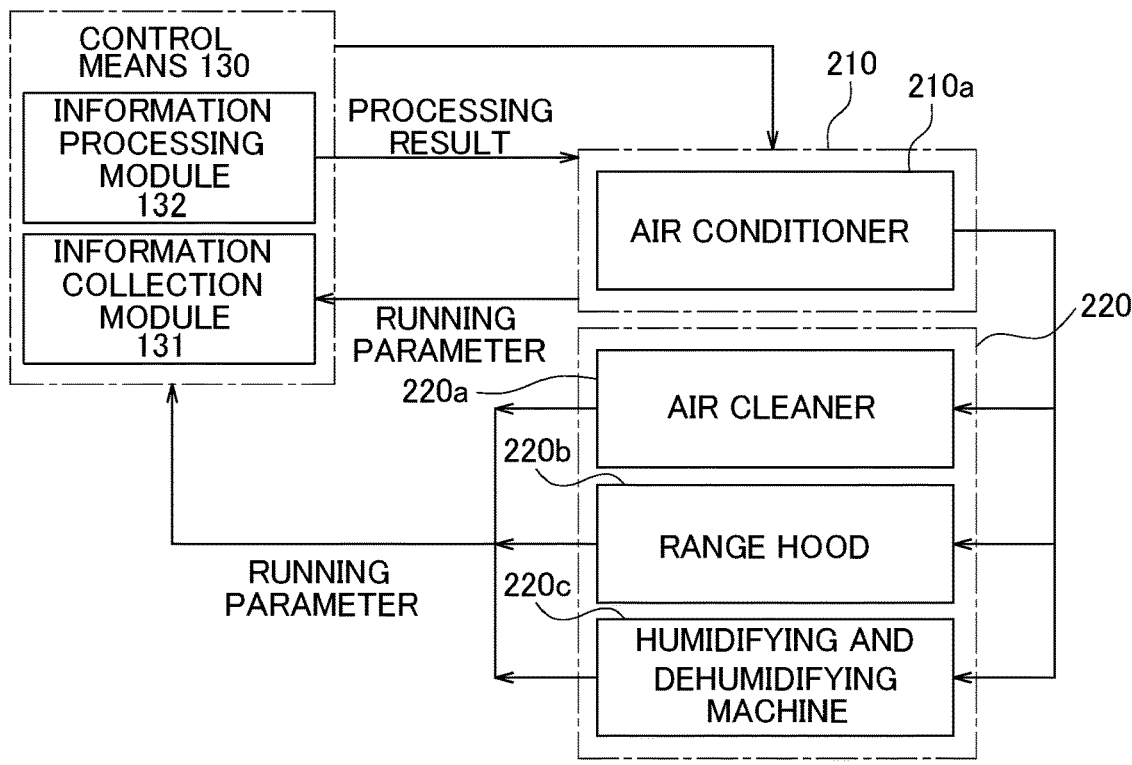
FIG. 2 is a configurational block diagram of an air quality management system according to a second embodiment of the present disclosure.

FIG. 2 is a configurational block diagram of an air quality management system according to a second embodiment of the present disclosure. As shown in FIG. 2, an air quality management system 200 in the present embodiment may include an air treatment apparatus 210a, air treatment apparatuses 220a to 220c, and the control means 130. The point of difference from the previous embodiment is that there are four air treatment apparatuses 220. The air treatment apparatuses 210a, and 220a to 220c may each be selected from various kinds of apparatuses each capable of adjusting the temperature, the humidity, the cleanness, or the circulation of air. Examples include an air conditioner, a fresh air apparatus, an air cleaner, a range hood, a ventilation fan, a humidifying and dehumidifying machine, and the like. The components in the present embodiment are almost the same as those of the previous embodiment; thus, herein, details of them are not developed.

Application examples of the present embodiment will now be shown.

The air treatment apparatus may include a first class air treatment apparatus 210 and a second class air treatment apparatus 220.

In an embodiment, the first class air treatment apparatus 210 is an air conditioner 210a, and is used in order to adjust the temperature of the space to be adjusted. The second class air treatment apparatus 220 is an apparatus that introduces outdoor fresh air, generates fresh air, or discharges indoor dirty air, and is, for example, an air cleaner 220a, a range hood 220b, or the like.

The air quality parameter collected by the information collection module 131 of the control means 130 may include an indoor air quality parameter and an outdoor air quality parameter, and each of the indoor air quality parameter and the outdoor air quality parameter may include an air temperature signal and an air cleanness signal. The air quality parameter is provided to the information processing module 132, for processing. In the case where the processing result has shown that the indoor air temperature parameter is outside a prescribed range and the indoor air cleanness parameter is within a prescribed range, the air conditioner 210a is set so as to have a running priority; in the case where the processing result has shown that the outdoor air cleanness is outside the range of a prescribed threshold and the indoor air temperature parameter is within a prescribed range, the air cleaner 220a is set so as to have a running priority; in the case where the processing result has shown that the indoor smoke concentration is outside a prescribed threshold range, the range hood is set so as to have a running priority. Thus, it is ensured that the air quality throughout the space to be adjusted satisfies requirements of the user.

According to another embodiment, the first class air treatment apparatus is an air conditioner 210a and the second class air treatment apparatus is one of the air cleaners 220a (or a fresh air apparatus or a ventilation fan). The control means 130 processes the indoor air quality parameter and the outdoor air quality parameter, the air conditioner 210a is set so as to have a running priority in a case where the processing result has shown that a difference between an indoor temperature and an outdoor temperature is larger than a prescribed threshold, one of the air cleaners 220a (or the fresh air apparatus or the ventilation fan) is set so as to have a running priority in a case where the processing result has shown that an indoor air cleanness is outside a prescribed range and the difference between the indoor temperature and the outdoor temperature is smaller than a prescribed threshold, and the air conditioner is set so as to have a running priority in a case where the processing result has shown that the difference between the indoor temperature and the outdoor temperature is larger than a prescribed threshold and the indoor air cleanness is outside a range of a prescribed threshold.

It will be understood that the running priorities mentioned above are only examples. In another example, air treatment apparatuses may be provided such that an air treatment apparatus having a second running priority (for example, a second air treatment apparatus) is provided, the operating state of the air treatment apparatus having the second running priority is adjusted by an air treatment apparatus having a first running priority, the operating state of another air treatment apparatus (for example, a third air treatment apparatus) is adjusted by the air treatment apparatus having the second running priority, and the another air treatment apparatus may have a third running priority.

For example, if a range hood 220b is set as an air treatment apparatus having a first running priority, an air cleaner is caused to have a second running priority, and an air conditioner is caused to have a third running priority. In this case, the range hood 220b can adjust the operating states of itself, the air conditioner, and the air cleaner. For example, the amount of fresh air introduced from an air cleaner 220a and the amount of emitted air can be adjusted (by adjusting the number of fan revolutions, the valve opening degree, etc.) in accordance with changes in smoke concentration and indoor temperature, the balance of the indoor air pressure can be ensured, and the amount of temperature adjustment of the air conditioner 210a can be adjusted based on the amount of fresh air introduced. The air cleaner can also adjust the amount of temperature adjustment of the air conditioner based on changes in smoke concentration and indoor temperature, and the amount of fresh air introduced. Setting different levels of running priority makes it possible to adjust the operating states of air treatment apparatuses in accordance with the actual situation, and increases the accuracy of control.

Figure 6:
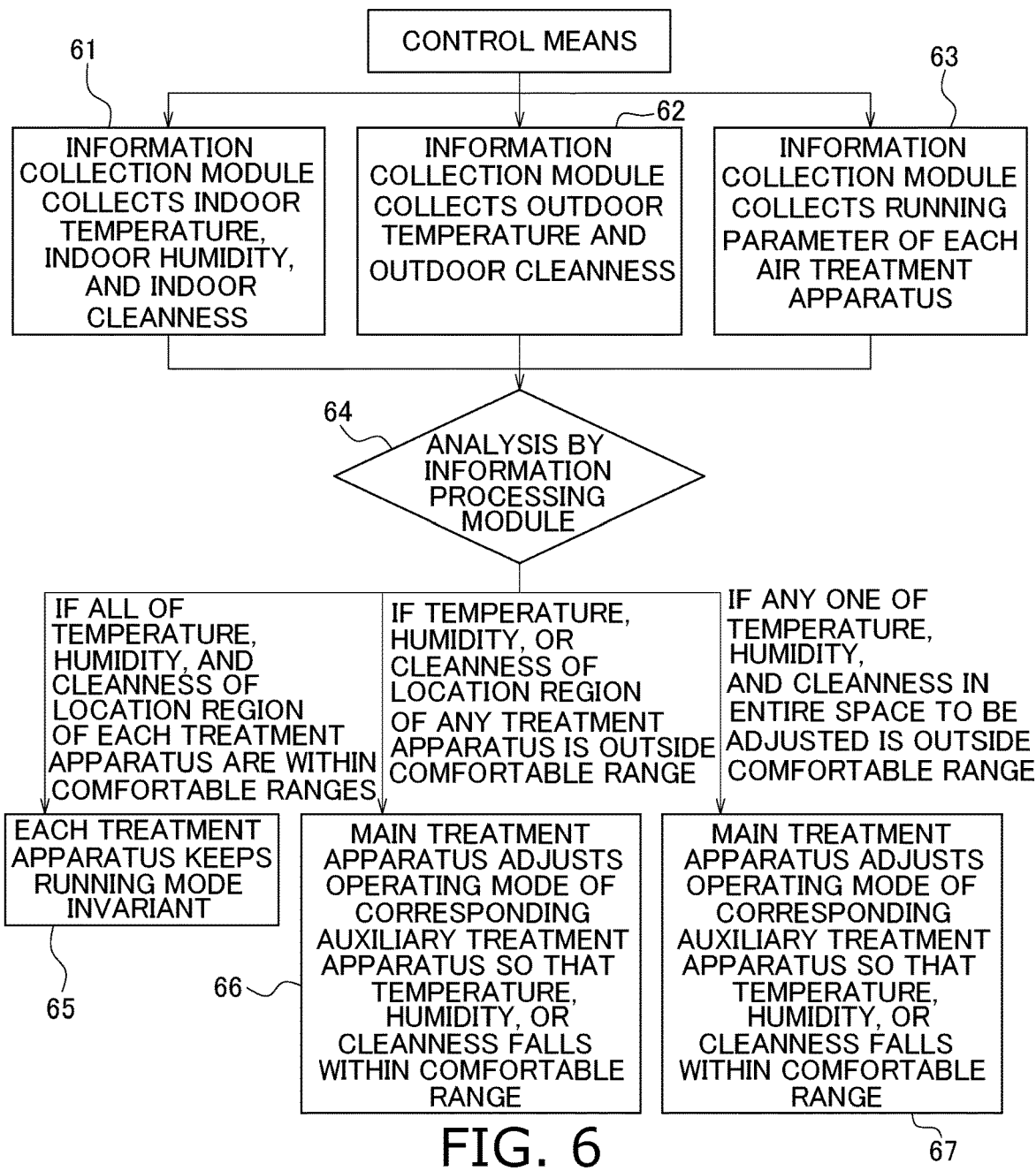
FIG. 6 shows another example of the air quality management method according to the present disclosure.

In another example, the air treatment apparatus 210 is an air conditioner 210a, and is used in order to adjust the temperature of the space to be adjusted. The air treatment apparatus 220 is an apparatus for generating fresh air or adjusting humidity, and is, for example, an air cleaner 220a or a humidifying and dehumidifying machine 220c. As shown in an example of the air quality management method according to the present disclosure shown in FIG. 6, the air conditioner 210a is set as a main treatment apparatus and the air cleaner 220a and the humidifying and dehumidifying machine 220c are set as an auxiliary treatment apparatus in manipulation 61. The information collection module 131 may execute at least one of manipulations 61 to 63 to collect at least one of the indoor temperature, the indoor humidity, and the indoor cleanness, the outdoor temperature and the outdoor cleanness, and the running parameter of each air treatment apparatus. The information processing module 132 may, in manipulation 64, analyze whether the indoor temperature, the indoor humidity, and the indoor cleanness are within ranges of temperature, humidity, and cleanness comfortable to the human body or not, and calculate the difference between the indoor temperature and the outdoor temperature and the difference between the outdoor cleanness and a prescribed cleanness. The information processing module 132 may provide the processing result to the air conditioner 210a. In the case where the humidity of the location region of the humidifying and dehumidifying machine 220c has exceeded (has become higher or lower than) a humidity range comfortable to the human body, in manipulation 66, the air conditioner 210a transmits a command to the humidifying and dehumidifying machine 220c, and the humidifying and dehumidifying machine 220c adjusts the humidity of its location region so that the humidity can satisfy requirements for comfort of the human body. In the case where the cleanness of the entire space to be adjusted is low, for example in the case where the $CO_2$ concentration is high, in manipulation 67, an air emission command or an air sending and air emission command is transmitted to the air cleaner 220a so that the cleanness in the space to be adjusted can satisfy requirements for comfort of the human body.

Figure 3:
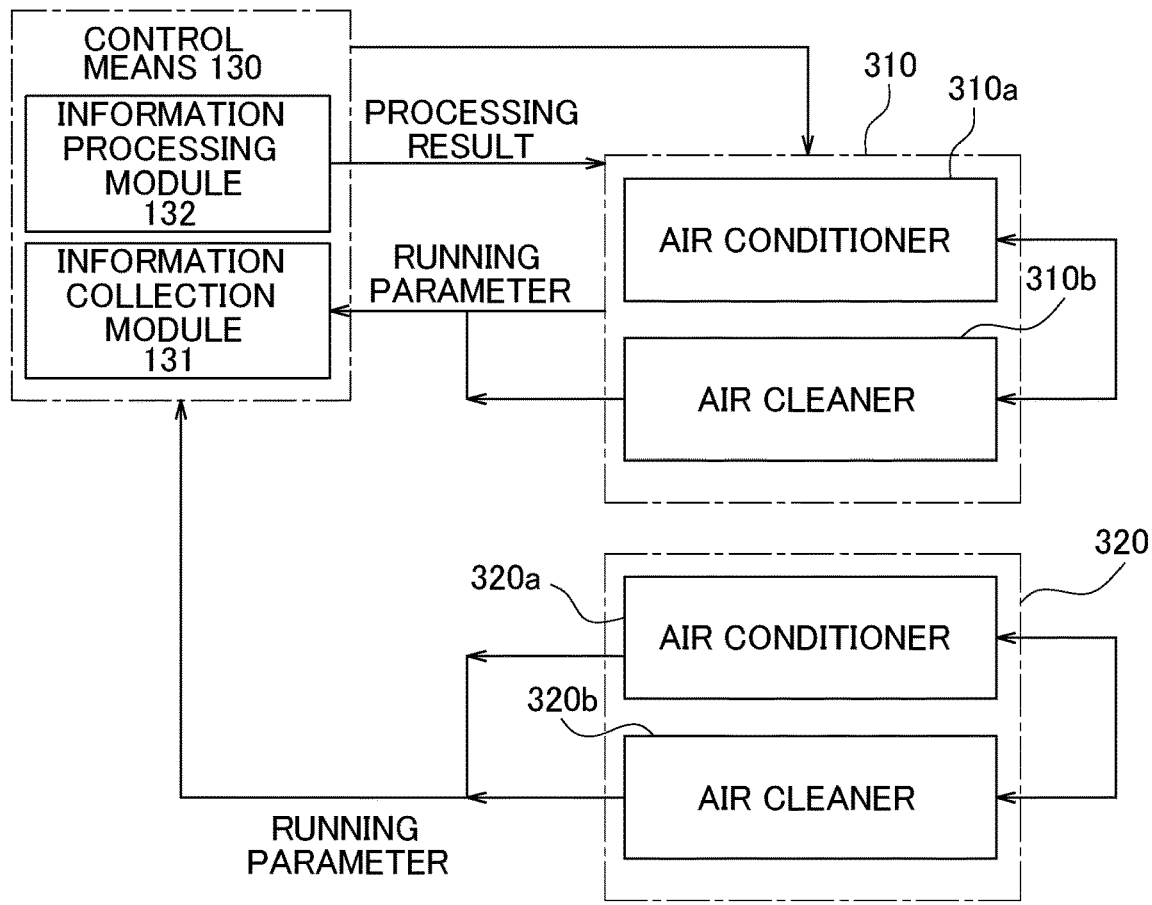
FIG. 3 is a configurational block diagram of an air quality management system according to a third embodiment of the present disclosure.

FIG. 3 is a configurational block diagram of an air quality management system according to a third embodiment of the present disclosure. As shown in FIG. 3, an air quality management system 300 in the present embodiment may include air treatment apparatuses 310 (310a, 310b) and 320 (320a, 320b), and the control means 130. The air treatment apparatuses 310a, and 310b, 320a, and 320b may each be selected from multiple kinds of apparatuses each capable of adjusting the temperature, the humidity, the cleanness, or the circulation of air, and examples may include, but not limited to, an air conditioner, a fresh air apparatus, an air cleaner, a range hood, a ventilation fan, a humidifying and dehumidifying machine, and the like. The appended drawings show an air conditioner 310a and an air cleaner 310b, and an air conditioner 320a and an air cleaner 320b as an example. The components in the present embodiment are almost the same as those of the previous embodiment; thus, herein, details of them are not developed.

In an embodiment, the air treatment apparatus may include a first class air treatment apparatus 310 and a second class air treatment apparatus 320. Like in the previous embodiment, the kinds of the first class air treatment apparatus and the second class air treatment apparatus may be decided on by the functions, location regions, etc. of the air treatment apparatuses. The point of difference from the previous embodiment is that the number of air treatment apparatuses of each of the two kinds may be plural.

Application examples of the present embodiment will now be shown.

In an embodiment, the first class air treatment apparatus 310 is installed in a first region, and the second class air treatment apparatus 320 is installed in a second region. The information collection module 131 of the control means 130 may collect a user parameter including at least the user's location region. The user parameter is provided to the information processing module 132, for processing. In the case where the processing result has shown that the user is in the first region, the air conditioner 310a, which is an air treatment apparatus 310 in the first region, is set so as to have a first running priority; in the case where the processing result has shown that the user is in the second region, the air conditioner 320a, which is an air treatment apparatus 320 in the second region, is set so as to have a first running priority. As a matter of course, in the case of the former, the air cleaner 310b may be set so as to have a second running priority, and the air conditioner 320a and the air cleaner 320b may be provided so as to have a third running priority; in the case of the latter, the opposite setting may be made.

In a preferred embodiment, in the case where the processing result has shown that the air treatment apparatus that performs air treatment on a region other than the user's location region (also referred to as an empty region) is an air cleaner, the information collection module 131 collects the air quality parameter of the empty region, and the information processing module 132 processes the air cleanness parameter of the empty region; in the case where the air cleanness parameter for the empty region is within a prescribed range, the air treatment apparatus having a running priority makes adjustment so as to turn off the air cleaner; in the case where the air cleanness parameter for the empty region is outside a prescribed range, the air treatment apparatus having a running priority makes adjustment so as to turn on the air cleaner.

In the present embodiment, the first region and the second region may be relatively independent different rooms in the space to be adjusted, or may be communicating different regions in the space to be adjusted. The main treatment apparatus, which is an air treatment apparatus having a miming priority, is set in accordance with the user's location region, and the running state of each air treatment apparatus is adjusted by the main treatment apparatus. Thereby, the air quality of the entire space to be adjusted is improved. Thus, not only can the air quality of the user's location region be adjusted so that requirements for comfort by the user can be satisfied, but also the air treatment apparatus in the empty region can be adjusted so that requirements by the user for the air quality of the entire space to be adjusted can be satisfied.

Figure 7:
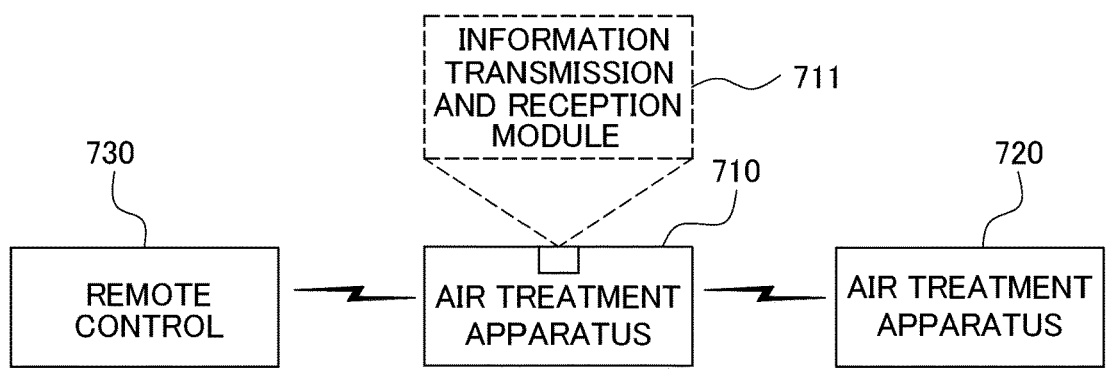
FIG. 7 shows an environment of interactive implementation of signals according to an embodiment of the present disclosure.

FIG. 7 shows an environment of interactive implementation of signals according to an embodiment of the present disclosure. As shown in FIG. 7, a method for interlocking air treatment apparatuses relates to a remote control 730, an air treatment apparatus 710, and an air treatment apparatus 720. The remote control 730 may be a remote control exclusively for the air treatment apparatus 710, or may be a general-purpose remote control capable of controlling a plurality of kinds of air treatment apparatuses. Here, in accordance with the embodiment mentioned above, it is assumed that the air treatment apparatus 710 is set so as to have a running priority, that is, is set as a main treatment apparatus. The air treatment apparatus 710 can control the air treatment apparatus 720 by transmitting a remote control signal, and the air treatment apparatus 720 can send a feedback signal back to the air treatment apparatus 710. As a matter of course, the air treatment apparatus 720 may be set so as to have a running priority, that is, may be set as a main treatment apparatus. At this time, the roles and the arrangement of the air treatment apparatus 710 and the air treatment apparatus 720 are exchanged. Preferably the remote control 730 uses an infrared signal to control the air treatment apparatus 710. Also the connection between the air treatment apparatus 710 and the air treatment apparatus 720 is made interactive by an infrared signal. For the kind of such a signal, it is not necessary to update a hardware device, and a hardware arrangement of a conventional air treatment apparatus may be used. Hence, the remote control 730 may include a transmission circuit for transmitting an infrared signal. The air treatment apparatus 710 includes a transmission circuit that transmits an infrared signal and a reception circuit that receives an infrared signal. Also the air treatment apparatus 720 includes a transmission circuit that transmits an infrared signal and a reception circuit that receives an infrared signal.

It will be understood that each of the remote control 730, the air treatment apparatus 710, and the air treatment apparatus 720 may send an order by using another kind of signal carrier, for example an RF signal. A typical example of it is an RF signal of 2.4 GHz UHF or 5G SHF ISM.

The air treatment apparatus 710 may include a controller, or may be connected to a controller. The air treatment apparatus 710 is designed so as to execute a control process upon receiving an order sent from the remote control 730. In the control process, the air treatment apparatus 710 may need to provide an interlocking signal to the air treatment apparatus 720. The controller may be the control means shown in FIG. 1.

The interior of the air treatment apparatus 720 may include a controller. The air treatment apparatus 720 is designed so as to execute a control process upon receiving an interlocking signal. In the control process, the air treatment apparatus 720 may need to send a feedback signal back to the air treatment apparatus 710.

Figure 8:
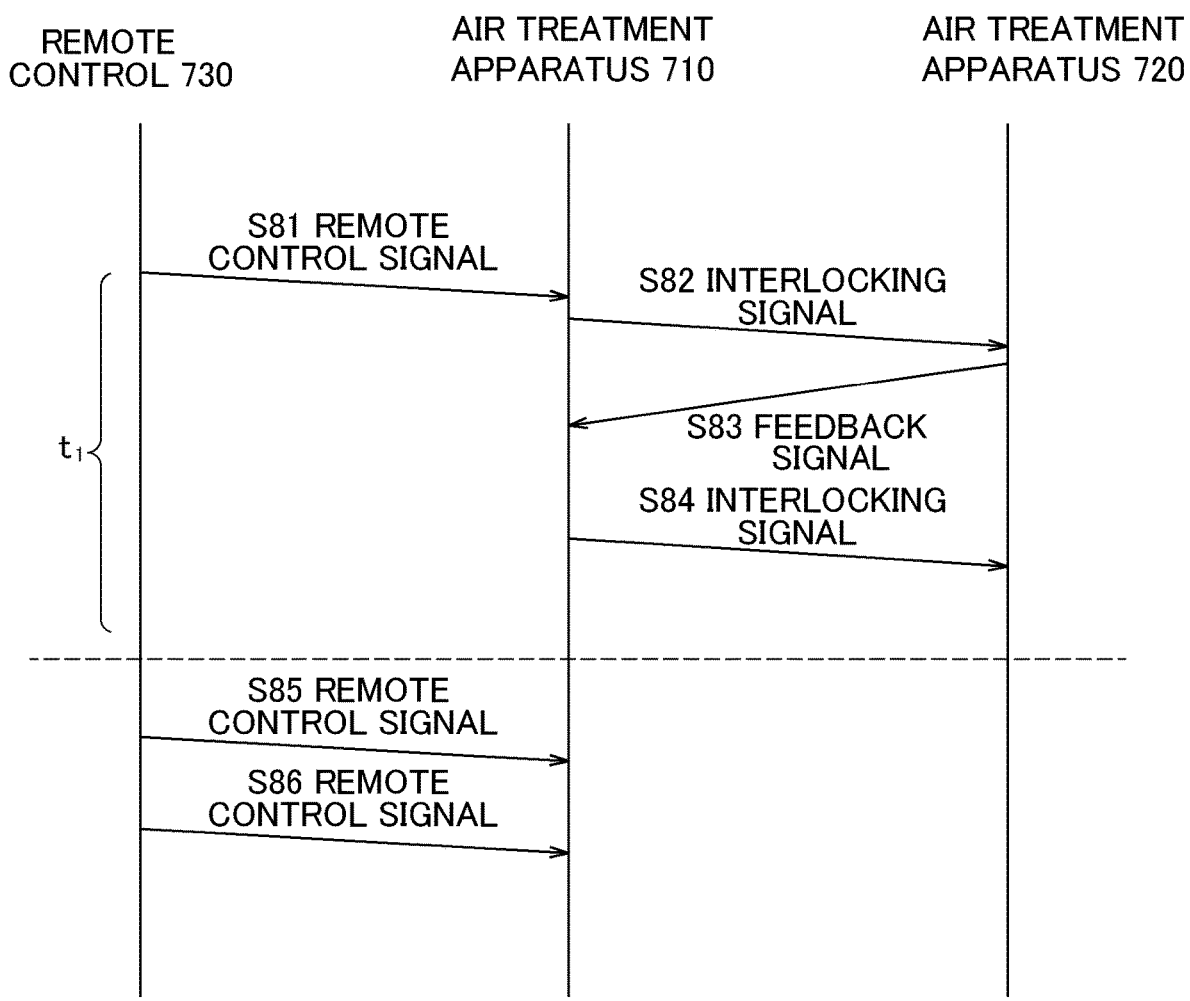
FIG. 8 shows an example of an interactive course of air treatment apparatuses according to an embodiment of the present disclosure.

FIG. 8 shows an example of an interactive course of air treatment apparatuses according to an embodiment of the present disclosure. As shown in FIG. 8, in step S81, the remote control 730 transmits a remote control signal to the air treatment apparatus 710 (a main treatment apparatus having a running priority). In the case where the air treatment apparatus 710 recognizes that interlocking with the air treatment apparatus 720 (an auxiliary treatment apparatus) is needed, in step S82 the air treatment apparatus 710 transmits an interlocking signal to the air treatment apparatus 720. In step S83, the air treatment apparatus 720 sends a feedback signal showing that it has received the interlocking signal back to the air treatment apparatus 710. Accordingly, in step S84, the air treatment apparatus 710 continuously transmits an interlocking signal to the air treatment apparatus 720, as necessary. . . . By repeating such a process, interlocking between the air treatment apparatus 710 and the air treatment apparatus 720 is completed after period t1 elapses. Then, the procedure goes to a second stage. In step S85, the remote control 730 transmits a remote control signal to the air treatment apparatus 710, and the air treatment apparatus 710 works in response to an order included in the remote control signal sent from the remote control 730. In step S86, the remote control 730 transmits another remote control signal to the air treatment apparatus 710, and the air treatment apparatus 710 works in response to an order included in another remote control signal sent from the remote control 730.

The interactive course shown in FIG. 8 is presumed to be a preferred case; however, in an actual application situation, since a user does not feel the response sent from the air treatment apparatus 710 in period t1, the user may think that the air treatment apparatus 710 may have not yet received the remote control signal, and may perform a re-manipulation. Alternatively, another user may, in this period, be manipulating another remote control to control the air treatment apparatus 710, for example.

Figure 9:
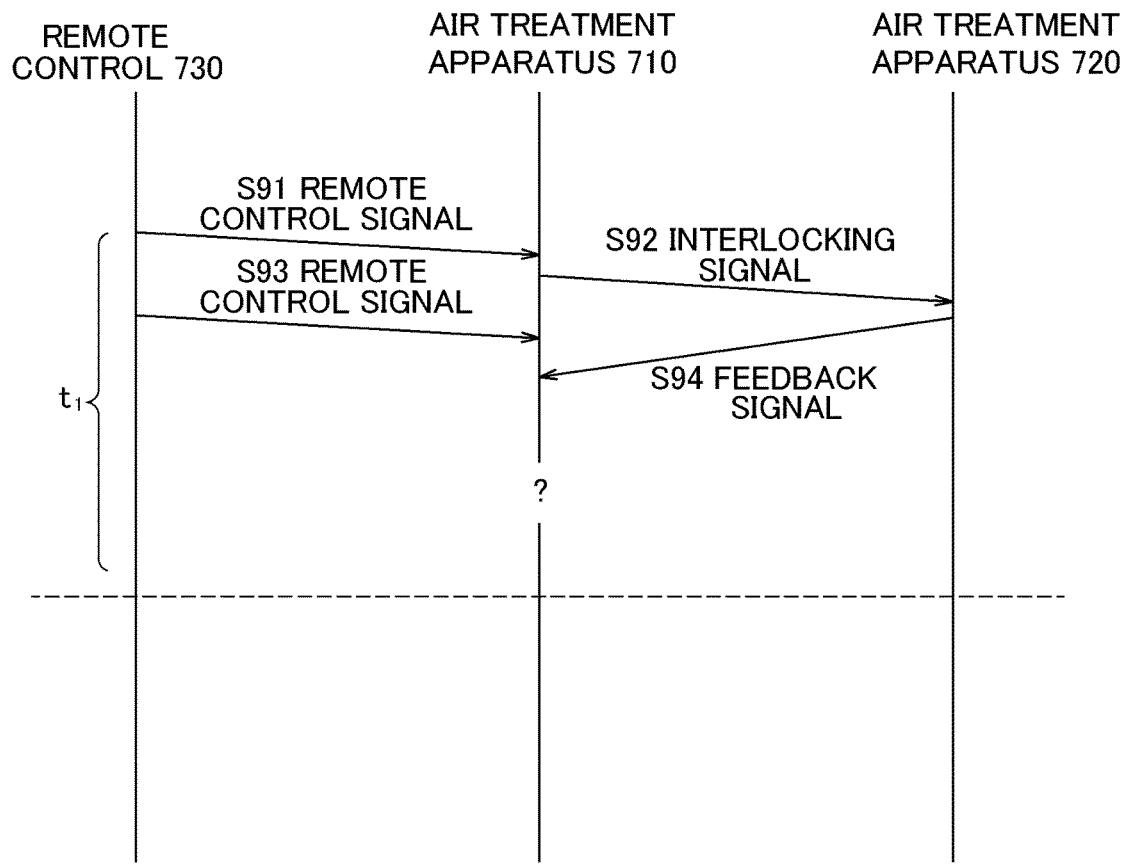
FIG. 9 shows an example of another interactive course of air treatment apparatuses according to an embodiment of the present disclosure.

FIG. 9 shows an example of another interactive course of air treatment apparatuses according to an embodiment of the present disclosure. As shown in FIG. 9, in step S91, the remote control 730 transmits a remote control signal to the air treatment apparatus 710 (a main treatment apparatus having a running priority). In the case where the air treatment apparatus 710 recognizes that interlocking with the air treatment apparatus 720 (an auxiliary treatment apparatus) is needed, in step S92 the air treatment apparatus 710 transmits an interlocking signal to the air treatment apparatus 720. In step S93, the remote control 730 re-transmits a remote control signal by a re-manipulation by the user. In step S94, the air treatment apparatus 720 sends a feedback signal showing that it has received the interlocking signal back to the air treatment apparatus 710. Thus, the air treatment apparatus 710 is designed so as to receive signals sent from the remote control 730 and the air treatment apparatus 720. In this case, how the air treatment apparatus 710 should respond is an issue.

In order to cause the air treatment apparatus 710 to follow the initial prescribed process even when it has received signals sent from the remote control 730 and the air treatment apparatus 720, in an embodiment of the present disclosure, a first information transmission and reception module 711 for handling the transmission and reception of signals and the collision of signals is provided in the interior of the air treatment apparatus 710.

Figure 10:
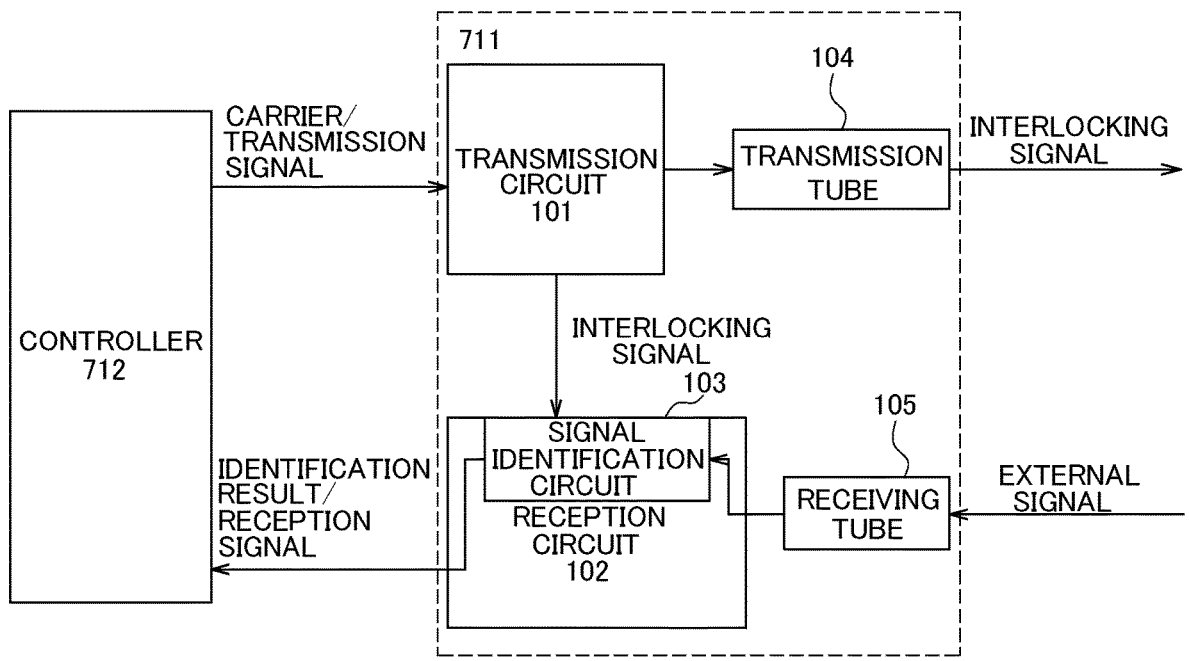
FIG. 10 is a configurational diagram of an information transmission and reception module according to an embodiment of the present disclosure.

FIG. 10 is a configurational diagram of an information transmission and reception module according to an embodiment of the present disclosure. As shown in FIG. 10, an information transmission and reception module 711 may be placed in the air treatment apparatus 710 or 720, and can transmit and receive a remote control signal. The information transmission and reception module 711 is connected to a controller 712 of the air treatment apparatus, and can receive a carrier from the controller 712 and transmit a signal, and can also send a received signal back to the controller 712. The information transmission and reception module 711 may include a transmission circuit 101, a reception circuit 102, a transmitting tube 104, and a receiving tube 105. The transmission circuit 101 is connected to the transmitting tube 104. The reception circuit 102 is connected to the receiving tube 105. For the air treatment apparatus 710, the transmission circuit 101 is placed so as to transmit an interlocking signal from the air treatment apparatus 710 to the air treatment apparatus 720. For the air treatment apparatus 720, the transmission circuit 101 can transmit a feedback signal from the air treatment apparatus 720 to the air treatment apparatus 710. The reception circuit 102 is used in order to receive an external signal. The reception circuit 102 includes a signal identification circuit 103. For the air treatment apparatus 710, the signal identification circuit 103 may be used in order to identify whether an external signal is a feedback signal relating to an interlocking signal sent from the air treatment apparatus 720 or not.

In the embodiment shown in FIG. 10, the signal identification circuit 103 may compare an external signal and an interlocking signal; in the case where the external signal matches with the interlocking signal, the signal identification circuit 103 may determine that the external signal is a feedback signal; in the case where the external signal does not match with the interlocking signal, the signal identification circuit 103 may determine that the external signal is not a feedback signal. The signal identification circuit 103 may be connected to the transmission circuit 101 and receive an interlocking signal. When comparing an external signal and an interlocking signal, the signal identification circuit 103 may compare the waveforms. As an example, an external signal and an interlocking signal may have the same signal head that can represent an identification code of the air treatment apparatus 710. In the case where the signal identification circuit 103, upon comparing an external signal and an interlocking signal, has revealed that the external signal and the interlocking signal have the same signal head, the signal identification circuit 103 recognizes that the external signal is a feedback signal relating to an interlocking signal sent from the air treatment apparatus 720.

The signal identification circuit 103 is connected to the controller 712, and outputs an identification result. In the case where the external signal is not a feedback signal, the controller 712 determines that the air treatment apparatus 720 has not received an interlocking signal, and instructs the transmission circuit 101 to re-transmit an interlocking signal; on the other hand, in the case where the external signal is a feedback signal, the controller 712 determines that the air treatment apparatus 720 has already received an interlocking signal, and instructs the transmission circuit 101 to transmit another interlocking signal.

In an embodiment of the present disclosure, there is a waiting time between adjacent two times of transmission of interlocking signals by the transmission circuit 101, and therefore a sufficient response time is given to the air treatment apparatus 720.

As described above, signals that are sent among the remote control 730, the air treatment apparatus 710, and the air treatment apparatus 720, for example a remote control signal, an interlocking signal, and a feedback signal, are each an infrared signal.

In the present embodiment, the transmission circuit 101 transmits an interlocking signal by means of, for example, a transmission device of the transmitting tube 104, and the reception circuit 102 receives an external signal by means of, for example, a reception device of the receiving tube 105.

A single-line interface may be used between the transmission circuit 101 and the controller 712. A single-line interface may be used also between the reception circuit 102 and the controller 712.

Figure 11:
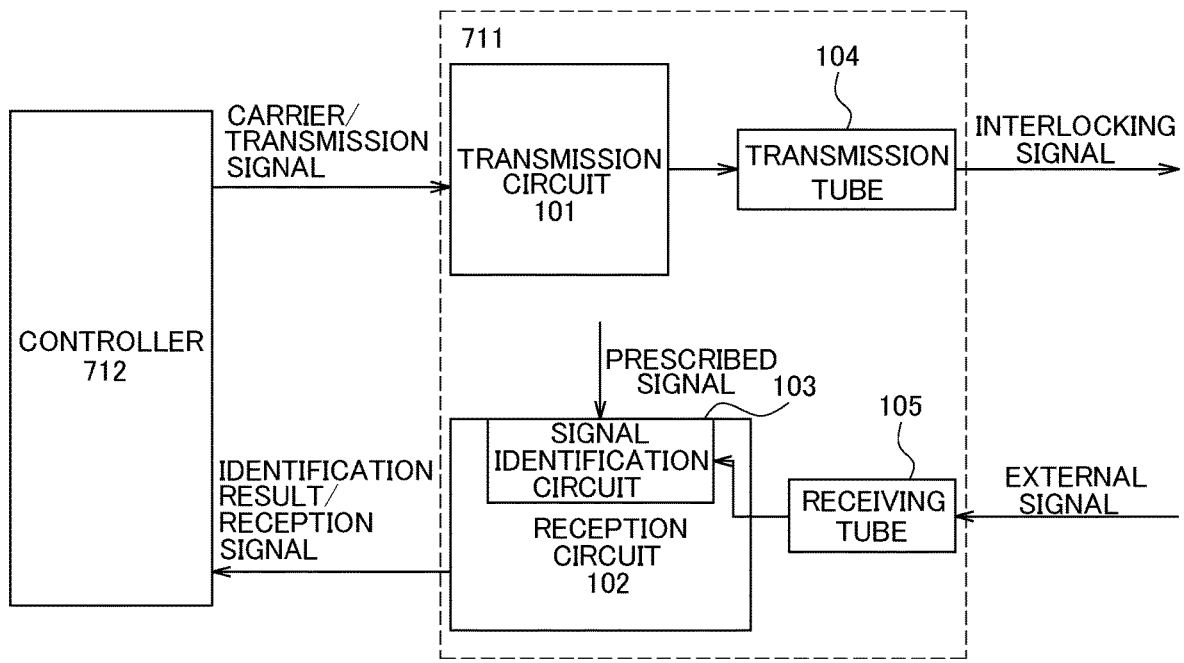
FIG. 11 is a configurational diagram of an information transmission and reception module according to another embodiment of the present disclosure.

FIG. 11 is a configurational diagram of an information transmission and reception module according to an embodiment of the present disclosure. As shown in FIG. 11, a main point of difference between the present embodiment and the previous embodiment is that what is inputted to the signal identification circuit 103 is not an interlocking signal sent from the transmission circuit 101 but a prescribed signal. The signal identification circuit 103 compares an external signal and a prescribed signal; in the case where the external signal matches with the prescribed signal, the signal identification circuit 103 determines that the external signal is a feedback signal; in the case where the external signal does not match with the prescribed signal, the signal identification circuit 103 determines that the external signal is not a feedback signal. The prescribed signal may be a signal sent from the controller 712, or may be a signal sent from another device.

The controller 712 of the air treatment apparatus 710 usually provides an interlocking signal to the information transmission and reception module 711 in the course of executing a control process.

Figure 12:
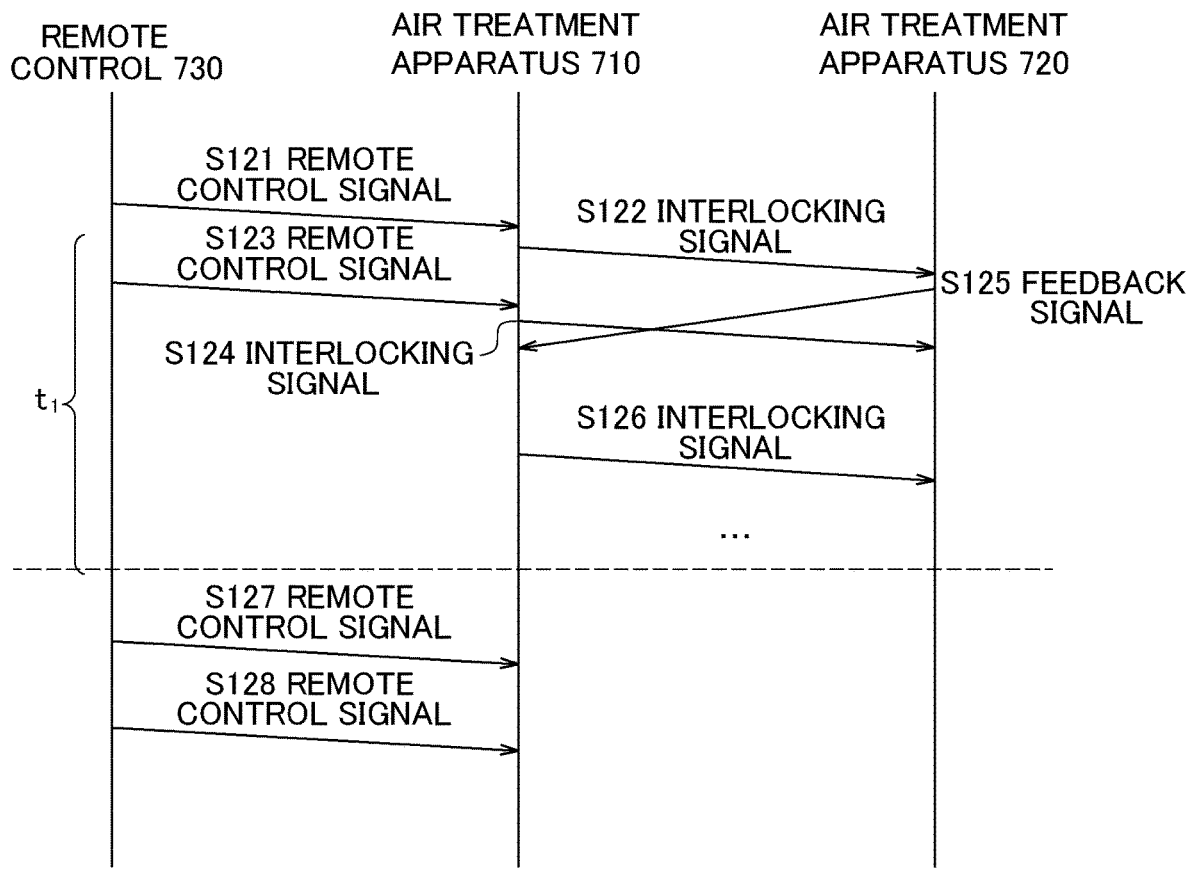
FIG. 12 shows an example of still another interactive course of air treatment apparatuses according to an embodiment of the present disclosure.

FIG. 12 shows an example of still another interactive course of air treatment apparatuses according to an embodiment of the present disclosure. As shown in FIG. 12, in step S121, the remote control 730 transmits a remote control signal to the air treatment apparatus 710 (a main treatment apparatus having a miming priority). In the case where the air treatment apparatus 710 recognizes that interlocking with the air treatment apparatus 720 (an auxiliary treatment apparatus) is needed, the air treatment apparatus 710 executes the control process described above, and transmits an interlocking signal to the air treatment apparatus 720 in step S122. However, in step S123, the remote control 730 re-transmits a remote control signal by a re-manipulation by the user. In this case, the information transmission and reception module 711 of the air treatment apparatus 710 identifies the signal; in the case where the information transmission and reception module 711 recognizes that the remote control signal received from the outside does not match with an interlocking signal, it re-transmits an interlocking signal in step S124. On the other hand, in step S125, the air treatment apparatus 720 sends a feedback signal showing that it has received the interlocking signal back to the air treatment apparatus 710. In this case, the information transmission and reception module 711 of the air treatment apparatus 710 identifies the signal; in the case where the information transmission and reception module 711 recognizes that the feedback signal received from the outside matches with an interlocking signal, it transmits another interlocking signal to the air treatment apparatus 720 in step S126. By repeating such a process, interlocking between the air treatment apparatus 710 and the air treatment apparatus 720 is completed after period t1 elapses. Then, the procedure goes to a second stage. In step S127, the remote control 730 transmits a remote control signal to the air treatment apparatus 710, and the air treatment apparatus 710 works in response to an order included in the remote control signal sent from the remote control 730. In step S128, the remote control 730 transmits another remote control signal to the air treatment apparatus 710, and the air treatment apparatus 710 works in response to an order included in the another remote control signal sent from the remote control 730.

Thus, by signal identification and collision detection by the information transmission and reception module, the first class air treatment apparatus 710 can work in conformity with an as-planned control process, and avoids not-handleable cases.

In the following, a situation where the present disclosure is applied to the air quality management system shown in FIG. 1 is shown as an example. Here, a case where the air treatment apparatus 110 is an air conditioner and the air treatment apparatus 120 is an air cleaner is used as an example. In the case where the air conditioner is started up by control with a remote control, the air conditioner enters a starting-up preparation state; however, it is detected that the indoor air is not good, and hence the air conditioner transmits an interlocking signal to the air cleaner and requires air purification by the air cleaner; after air purification, the air conditioner further starts up and operates in a set mode. In this case, the air conditioner is designed such that, if it receives a remote control signal sent from the remote control again, it detects that the remote control signal sent from the remote control and the interlocking signal transmitted to the air cleaner do not match, and the air conditioner system does not execute the action shown by the remote control signal but re-transmits an interlocking signal to the air cleaner. The air conditioner system is designed such that, if it receives a feedback signal fed back from the air cleaner, it detects that the feedback signal and the interlocking signal transmitted to the air cleaner match, and the air conditioner continuously executes the process and, as necessary, transmits another interlocking signal to the air cleaner. After period t1 elapses, feedback is performed from the air cleaner to the air conditioner system, the purification of air finishes, and the air conditioner further starts up and operates in a set mode.

Thus, the information transmission and reception module of the air treatment apparatus in the present embodiment can finish collision detection by signal identification, and thereby it is ensured that the air treatment apparatus operates in conformity with a prescribed process.

The present disclosure gives a description in conformity with current specific embodiments; however, a person skilled in the art should recognize that the above embodiments are only those for describing the present disclosure and various equivalent alterations or substitutions can be made without departing from the gist of the present disclosure. Therefore, all alterations and modifications of the embodiments mentioned above made within the scope of the substantial spirit of the present disclosure are included in the scope of claims of the present application.

Having described the embodiments of the present disclosure, it would be understood that a variety of modifications will be made on the morphology or other details, without departing from the spirit and scope described in claims.

What is claimed is:

1. An air quality management system comprising:
   a plurality of air treatment apparatuses mutually associated; and
   a control means connected to each of the plurality of air treatment apparatuses, the control means being configured to make setting such that one air treatment apparatus of the plurality of air treatment apparatuses has a running priority,
   the control means including an information collection module that collects at least one of a user parameter, an air quality parameter, and a running parameter of the air treatment apparatuses,
   the control means being configured to
      process information collected by the information collection module and
      acquire a processing result,
   the control means being configured to set a running priority of one of the air treatment apparatuses based on the processing result, and
   the air treatment apparatus that is set so as to have the running priority adjusting an operating state thereof based on the processing result, and
   simultaneously the air treatment apparatus having the running priority adjusting an operating state of another of the air treatment apparatuses in the air quality management system based on the processing result,
   the plurality of air treatment apparatuses including three or more air treatment apparatuses,
   the control means, based on the processing result, being configured to make setting such that one air treatment apparatus of the three or more air treatment apparatuses has a first running priority,
   the air treatment apparatus having the first running priority
      adjusting operating states of the three or more air treatment apparatuses based on the processing result, and
      based on the processing result, making setting such that another air treatment apparatus of the three or more air treatment apparatuses has a second running priority, and
   the air treatment apparatus having the second running priority, based on the processing result, adjusting an operating state of another air treatment apparatus other than the air treatment apparatus having the first running priority of the three or more air treatment apparatuses.

2. The air quality management system according to claim 1, wherein
   the user parameter includes one or more of a user's location region, a user's living body parameter, and a user's activity state.

3. The air quality management system according to claim 1, wherein
   the air quality parameter includes at least one of an air temperature parameter, an air cleanness parameter, and an air humidity parameter.

4. The air quality management system according to claim 1, wherein
   the control means includes an information processing module that
      processes information collected by the information collection module and
      acquires a processing result.

5. The air quality management system according to claim 1, wherein
   the plurality of air treatment apparatuses include a first class air treatment apparatus and a second class air treatment apparatus,
   the first class air treatment apparatus is an air conditioner,
   the second class air treatment apparatus is one of a fresh air apparatus, an air cleaner, and a ventilation fan,
   the air quality parameter includes an air temperature parameter and an air cleanness parameter,
   the control means processes the air quality parameter,
   the first class air treatment apparatus is set so as to have a running priority in a case in which the processing result has shown that an indoor air temperature parameter is outside a prescribed range and an indoor air cleanness parameter is within a prescribed range, and
   the air conditioner adjusts an operating state of one of the fresh air apparatus, the air cleaner, and the ventilation fan based on the processing result.

6. The air quality management system according to claim 1, wherein
   the plurality of air treatment apparatuses include a first class air treatment apparatus and a second class air treatment apparatus,
   the first class air treatment apparatus is an air conditioner,
   the second class air treatment apparatus is one of a fresh air apparatus, an air cleaner, a ventilation fan, and a humidifying and dehumidifying machine,
   the air quality parameter includes an air temperature parameter, an air cleanness parameter, and an air humidity parameter,
   the control means processes the air quality parameter,
   the first class air treatment apparatus is set so as to have a running priority in a case in which the processing result has shown that an indoor air temperature parameter is outside a prescribed range, an indoor air cleanness parameter is within a prescribed range, and an indoor air humidity parameter is within a prescribed range, and
   the first class air treatment apparatus adjusts an operating state of another of the air treatment apparatuses based on the processing result.

7. The air quality management system according to claim 1, wherein the plurality of air treatment apparatuses include at least two air treatment apparatuses that perform air treatment on two regions, respectively, the information collection module collects a user parameter including at least a user's location region, the control means
  processes the user parameter, and
  based on the processing result, makes setting such that one air treatment apparatus corresponding to the user's location region of the air treatment apparatuses has a running priority, and the air treatment apparatus having the miming priority adjusts operating states of the plurality of air treatment apparatuses based on the processing result.

8. The air quality management system according to claim 7, wherein
  in a case in which the processing result has shown that one of the air treatment apparatuses that performs air treatment on the region other than the user's location region is an air conditioner, the air treatment apparatus having the running priority makes adjustment so as to turn off the air conditioner.

9. An air quality management system comprising:
  a plurality of air treatment apparatuses mutually associated; and
  a control means connected to each of the plurality of air treatment apparatuses, the control means being configured to make setting such that one air treatment apparatus of the plurality of air treatment apparatuses has a running priority,
  the control means including an information collection module that collects at least one of a user parameter, an air quality parameter, and a running parameter of the air treatment apparatuses,
  the control means being configured to
    process information collected by the information collection module and
    acquire a processing result,
  the control means being configured to set a running priority of one of the air treatment apparatuses based on the processing result, and
  the air treatment apparatus that is set so as to have the running priority adjusting an operating state thereof based on the processing result, and
  simultaneously the air treatment apparatus having the running priority adjusting an operating state of another of the air treatment apparatuses in the air quality management system based on the processing result,
  each of the plurality of air treatment apparatuses including an information transmission and reception module,
  the information transmission and reception module including
    a transmission circuit placed so as to transmit an interlocking signal and a feedback signal, and
    a reception circuit for receiving an external signal,
  the reception circuit including a signal identification circuit configured to identify whether the external signal is the feedback signal or not and the interlocking signal transmitted from the air treatment apparatus having the running priority,
  the transmission circuit in the air treatment apparatus having the running priority transmitting the interlocking signal to another of the air treatment apparatuses, and
  the reception circuit in the air treatment apparatus having the running priority receiving the external signal, and the signal identification circuit of the reception circuit identifying whether the external signal is the feedback signal sent from another air treatment apparatus or not.

10. The air quality management system according to claim 9, wherein
  the signal identification circuit in the air treatment apparatus having the running priority is further
    connected to the transmission circuit in the air treatment apparatus and
    receives the interlocking signal, and
  the signal identification circuit
    compares the external signal and the interlocking signal,
    in a case in which the external signal matches with the interlocking signal, determines that the external signal is the feedback signal, and
    in a case in which the external signal does not match with the interlocking signal, determines that the external signal is not the feedback signal.

11. The air quality management system according to claim 9, wherein
  the signal identification circuit in the air treatment apparatus having the running priority
    sets a prescribed signal in advance,
    the signal identification circuit compares the external signal and the prescribed signal,
    in a case in which the external signal matches with the prescribed signal, determines that the external signal is the feedback signal, and
    in a case in which the external signal does not match with the prescribed signal, determines that the external signal is not the feedback signal.

12. The air quality management system according to claim 9, wherein
  the signal identification circuit in the air treatment apparatus having the running priority
    is connected to the control means,
    outputs an identification result, and
    the control means, based on the identification result, instructs the transmission circuit in the air treatment apparatus having the running priority whether to re-transmit the interlocking signal or not.

13. The air quality management system according to claim 9, wherein
  the control means
    executes a control process,
    provides the interlocking signal to the information transmission and reception module in the air treatment apparatus having the running priority,
    in a case in which the external signal is the feedback signal, continuously executes the control process and thus instructs the transmission circuit in the air treatment apparatus having the running priority to transmit another interlocking signal, and
    in a case in which the external signal is not the feedback signal, instructs the transmission circuit to re-transmit the interlocking signal.

14. The air quality management system according to claim 13, wherein
  a waiting time exists between adjacent two times of transmission of the interlocking signals sent by the transmission circuit in the air treatment apparatus having the running priority.

15. An air quality management method including the air quality management system according to claim 1, the method comprising:
  providing a plurality of air treatment apparatuses mutually associated; and providing a control means connected to each of the plurality of air treatment apparatuses, the control means being configured to make setting such that one air treatment apparatus of the plurality of air treatment apparatuses has a running priority, the control means including an information collection module that collects at least one of a user parameter, an air quality parameter, and a running parameter of the air treatment apparatuses, the control means
processing information collected by the information collection module and
acquiring a processing result, the control means setting the running priority of the air treatment apparatus based on the processing result, and the air treatment apparatus that is set so as to have the running priority adjusting an operating state thereof based on the processing result, and simultaneously the air treatment apparatus having the running priority adjusting an operating state of another of the air treatment apparatuses in the system based on the processing result.

16. The air quality management method according to claim 15, wherein the plurality of air treatment apparatuses include a first class air treatment apparatus and a second class air treatment apparatus, the control means
determines that the first class air treatment apparatus is an air conditioner and
assesses that the second class air treatment apparatus is one of a fresh air apparatus, an air cleaner, and a ventilation fan, the information collection module collects an indoor air temperature parameter and an indoor air cleanness parameter, the information processing module processes the air quality parameter, the control means makes setting such that the first class air treatment apparatus has the running priority in a case in which the processing result has shown that the indoor air temperature parameter is outside a prescribed range and the indoor air cleanness parameter is within a prescribed range, the first class air treatment apparatus adjusts an operating state of the second class air treatment apparatus based on the processing result, the control means makes setting such that the second class air treatment apparatus has the running priority in a case in which the processing result has shown that the indoor air temperature parameter is within a prescribed range and the indoor air cleanness parameter is outside a prescribed range, and the second class air treatment apparatus adjusts an operating state of the first class air treatment apparatus based on the processing result.

17. The air quality management method according to claim 15, wherein the plurality of air treatment apparatuses include a first class air treatment apparatus and a second class air treatment apparatus, the control means determines that the first class air treatment apparatus is an air conditioner and assesses that the second class air treatment apparatus is one of a fresh air apparatus, an air cleaner, a ventilation fan, and a humidifying and dehumidifying machine, the information collection module collects an air temperature parameter, an air cleanness parameter, and an air humidity parameter, the control means processes the air quality parameter, the control means makes setting such that the first class air treatment apparatus has the running priority in a case in which the processing result has shown that an indoor air temperature parameter is outside a prescribed range, an indoor air cleanness parameter is within a prescribed range, and an indoor air humidity parameter is within a prescribed range, and the first class air treatment apparatus adjusts an operating state of another of the air treatment apparatuses based on the processing result.

18. The air quality management method according to claim 15, wherein three or more air treatment apparatuses are provided, the control means, based on the processing result, makes setting such that one air treatment apparatus of the three or more air treatment apparatuses has a first running priority, the air treatment apparatus having the first running priority
adjusts operating states of the three or more air treatment apparatuses based on the processing result, and
based on the processing result, makes setting such that another air treatment apparatus of the three or more air treatment apparatuses has a second running priority, and the air treatment apparatus having the second running priority, based on the processing result, adjusts an operating state of another air treatment apparatus other than the air treatment apparatus having the first running priority of the three or more air treatment apparatuses.

19. The air quality management method according to claim 15, wherein the plurality of air treatment apparatuses include at least two air treatment apparatuses that perform air treatment on two regions, respectively, the information collection module collects a parameter of a user's location region, the control means
processes the parameter of the user's location region, and
based on the processing result, makes setting such that one air treatment apparatus corresponding to the user's location region of the air treatment apparatuses has a running priority, and the air treatment apparatus having the running priority adjusts operating states of the plurality of air treatment apparatuses based on the processing result.

* * * * *